United States Patent
Murasaki et al.

(10) Patent No.: US 8,795,564 B2
(45) Date of Patent: Aug. 5, 2014

(54) MALE SURFACE FASTENER MEMBER FOR USE IN A CUSHION BODY MOLD AND MANUFACTURING METHOD THEREOF

(75) Inventors: Ryuichi Murasaki, Toyama (JP);
Yasutoshi Nozawa, Macon, GA (US);
Wolfgang E. Coronel, Macon, GA (US);
Hisashi Yoneshima, Macon, GA (US);
Shinichi Imai, Toyama (JP)

(73) Assignee: YKK Corporation

( * ) Notice: Subject to any disclaimer, the term of this patent is extended or adjusted under 35 U.S.C. 154(b) by 892 days.

(21) Appl. No.: 12/948,594

(22) Filed: Nov. 17, 2010

(65) Prior Publication Data

US 2011/0062615 A1 Mar. 17, 2011

Related U.S. Application Data

(62) Division of application No. 12/355,933, filed on Jan. 19, 2009, now Pat. No. 7,998,548.

(51) Int. Cl.
*B29C 69/02* (2006.01)
*B29C 44/14* (2006.01)
*B29C 47/00* (2006.01)

(52) U.S. Cl.
USPC .............. 264/176.1; 24/442; 24/443; 24/447; 24/450; 264/165; 425/376.1; 428/98; 428/120

(58) Field of Classification Search
USPC ......... 24/442, 443, 447, 450; 264/165, 176.1; 425/376.1; 428/98, 120
See application file for complete search history.

(56) References Cited

U.S. PATENT DOCUMENTS

| | | |
|---|---|---|
| 1,628,836 A | 5/1927 | Gammeter |
| 3,020,613 A | 2/1962 | Morin |
| 3,390,680 A | 7/1968 | Marcum |
| 3,392,497 A | 7/1968 | Cushman |
| 3,717,908 A | 2/1973 | Perina |
| 4,651,355 A | 3/1987 | White |
| 4,673,542 A | 6/1987 | Wigner et al. |
| 5,061,540 A | 10/1991 | Cripps |

(Continued)

FOREIGN PATENT DOCUMENTS

| | | |
|---|---|---|
| DE | 29822649 U1 | 5/1999 |
| DE | 19949423 C1 | 1/2001 |

(Continued)

OTHER PUBLICATIONS

Office Action dated Dec. 20, 2010, U.S. Appl. No. 12/355,933.

(Continued)

*Primary Examiner* — Brent O'Hern
(74) *Attorney, Agent, or Firm* — Alston & Bird LLP

(57) ABSTRACT

Various embodiments include a male surface fastener member configured for being molded onto a surface of a foaming resin mold body. The male surface fastener member includes a plurality of male surface fastener strips connected with each other in an end-to-end relationship via a connecting portion that is integrally formed with at least the end portions of each male surface fastener strips. Each male surface fastener strip includes a base material having a first surface from which a plurality of engaging elements extend upwardly and first and second substantially lateral resin intrusion prevention walls that upwardly from the first surface along a width direction of the base material between the first and second longitudinal resin intrusion prevention walls. Each of the lateral resin intrusion prevention walls comprises a plurality of engaging elements that are arranged in series in a width direction of the first surface.

6 Claims, 17 Drawing Sheets

(56) References Cited

U.S. PATENT DOCUMENTS

| | | |
|---|---|---|
| 5,286,431 A | 2/1994 | Banfield et al. |
| 5,606,781 A | 3/1997 | Provost et al. |
| 5,744,080 A | 4/1998 | Kennedy et al. |
| 5,766,723 A | 6/1998 | Oborny et al. |
| 6,235,369 B1 | 5/2001 | Shepard et al. |
| 6,537,643 B1 | 3/2003 | Poulakis |
| 6,656,563 B1 | 12/2003 | Leach et al. |
| 6,803,010 B2 | 10/2004 | Leach et al. |
| 2002/0164449 A1 | 11/2002 | Fujisawa et al. |
| 2002/0164451 A1 | 11/2002 | Fujisawa et al. |
| 2005/0160534 A1 | 7/2005 | Akeno et al. |
| 2005/0189811 A1 | 9/2005 | Herrmann et al. |
| 2005/0264642 A1 | 12/2005 | Tischer et al. |
| 2007/0194611 A1 | 8/2007 | Munoz Herrero et al. |
| 2007/0240289 A1 | 10/2007 | Murasaki et al. |
| 2008/0048474 A1 | 2/2008 | Pedde et al. |
| 2009/0300890 A1 | 12/2009 | Coronel et al. |

FOREIGN PATENT DOCUMENTS

| | | |
|---|---|---|
| JP | H03-146003 A | 6/1991 |
| JP | 5211909 | 8/1993 |
| JP | 2788564 B2 | 6/1998 |
| JP | 2000-135147 A | 5/2000 |
| JP | 2003-144207 A | 5/2003 |
| JP | A-2005-211198 | 8/2005 |
| JP | 4108319 B2 | 6/2008 |
| WO | WO 96/25063 | 8/1996 |

OTHER PUBLICATIONS

U.S. Appl. No. 12/133,572, filed Jun. 5, 2008, entitled *Flexible Fastener Strip Assembly and Methods of Assembling the Same.*

U.S. Appl. No. 12/353,538, filed Jan. 14, 2009, entitled *Systems and Methods of Installing Hook Fastener Elements in a Mold Assembly.*

Office Action dated Sep. 15, 2009 for corresponding U.S. Appl. No. 12/353,538.

Office Action dated Aug. 12, 2010 for U.S. Appl. No. 12/353,538.

European Patent Office, Extended European Search Report and Search Opinion for Application No. 102550082.4, dated Oct. 9, 2012, 22 pages, The Netherlands.

Partial European Search Report dated Dec. 1, 2011 for corresponding European Application No. 10250082.4.

Office Action of Korean Application No. 10-2010-4227 dated Aug. 24, 2011.

MALE SURFACE FASTENER MEMBER FOR USE IN A CUSHION BODY MOLD AND MANUFACTURING METHOD THEREOF

CROSS-REFERENCE TO RELATED APPLICATION

This application is a divisional of U.S. application Ser. No. 12/355,933 filed on Jan. 19, 2009 now U.S. Pat. No. 7,998,548, which is hereby incorporated by reference in its entirety.

BACKGROUND OF THE INVENTION

A seat for an automobile, a train, various sofas, an office chair, or the like may be provided with a cushion body, and an epidermis material is disposed over the cushion body. This cushion body has been manufactured from so-called "rock wool," which is made by interlacing a rigid fiber (e.g., a palm fiber, a hemp fiber, or a bold synthetic fiber) and firmly fixing it by a rubber or the like. Alternatively, this cushion body is molded from various types of foaming resin materials.

Typically, the cushion body has a curved face having a concavo-convex shape that is ergonomically satisfactory. For example, the shape of the cushion body allows a passenger to keep a relatively comfortable seating posture even if the passenger has been seated for a long time.

It is difficult to manufacture cushion bodies efficiently on a mass production basis using rock wool. However, a cushion body made of a foaming resin can be manufactured easily (e.g., by a single manufacturing step), and these cushion bodies can be made easily to have various shapes. For example, the cushion body made of a foaming resin can be obtained in such a manner that a foaming resin material (e.g., an urethane foam resin) is poured into a mold defining the desired shape, and the foaming resin material is molded into the desired shape simultaneously with foaming.

Once the cushion body has been molded, an epidermis material (e.g., various fiber cloths, natural or artificial leather) is integrally joined over the surface of the surface of the cushion body. To effect this integral mounting, the foaming resin material may be poured into the epidermis material to integrate the cushion body on the inner surface of the epidermis material at the same time as molding. Alternatively, the epidermis material may be slipped over and firmly fixed to the outer surface of the cushion body after the cushion body has been molded.

To mold the foaming resin material integrally within the epidermis material, the epidermis material is set along an inner face of the mold, and the epidermis material is absorbed along the inner face of the mold by using an absorbing means. However, to modify the epidermis material along with the surface of the cushion body that has the above-described curved surface, it is necessary for the epidermis material to be a material that is excellent in its elasticity. However, this process typically results in huge numbers of creases, particularly, between the seat face and the peripheral face, because the elasticity is limited depending on a material.

In addition, in this integral molding process, the cushion body and the epidermis material are integrated on the entire face of the cushion body. Thus, for example, when a strong force is applied in a certain direction that results in displacement of the epidermis material relative to the surface of the cushion body, a shear force is effected between the epidermis material and the cushion body. In many cases, this shear force may cause the cushion body to be partially sheared and the epidermis material to be separated. In addition, the materials capable of reducing the appearance of creases that can be used as epidermis materials are limited. Furthermore, a small amount of movement between the epidermis material and the cushion body should be expected, so materials capable of tolerating the small amount of movement are preferred. In light of these limitations and disadvantages of integrally molding the epidermis material at the same time as molding the cushion body, a method for applying the epidermis material to the cushion body that has been molded in advance has been employed in many cases.

According to a general method for applying the epidermis material to such a cushion body made of the foaming resin material, a male surface fastener member is integrally and firmly fixed on a particular region of the surface of the cushion body. The male surface fastener member has a narrow flat-type base material, and many hook-shaped engaging elements extend from one face of the base material. The male surface fastener member is integrally fixed on the surface of the cushion body such that the hook-shaped engaging elements are exposed (i.e., face away from the surface of the cushion body). The epidermis material includes a loop material as a female fastener member formed on certain portions of the inner surface of the epidermis material. Accordingly, when the epidermis material is slipped over the cushion body, the loop material on the inner surface of the epidermis material is pressed against the male surface fastener members on the cushion body to fix firmly the epidermis material to the cushion body.

The epidermis material may be made of various materials, such as a pile-woven knit fabric, a natural leather, or an artificial leather, and the materials may be formed in advance into a bag-like shape having the appearance of the cushion body. The epidermis material is slipped over the cushion body, and the female engaging elements arranged on the inner surface of the epidermis material are pressed against the engaging elements secured onto the outside surface of the cushion body. The epidermis material is joined and firmly fixed along the concave face of the cushion body, and uplift of the epidermis material from the cushion body is prevented.

To integrally and firmly fix the male surface fastener member to the cushion body, the engaging elements formed on the face of the male surface fastener member are disposed to face a projection face of a mold for molding a concave face of a cushion body according to the shape of the projection face. A foaming resin material is poured into the inside of the mold so as to foam and mold the cushion body, and at the same time, the male surface fastener member is partially buried in the face of the cushion body with the engaging elements of the male surface fastener member being exposed to the outside of the cushion body. When foaming and molding the cushion body, it is desirable to prevent the foaming resin material from being poured into the zone on which the engaging elements are formed.

To prevent the foaming resin material from intruding into the zone on which the engaging elements of the surface fastener are formed during molding of the cushion body, solid walls 104 and 105, as shown in FIGS. 20 and 21, have been integrally formed along a peripheral edge portion of a base material 102 of a surface fastener 110 so as to surround the engaging elements 103 along the longitudinal edges of the surface fastener 110. The lateral solid wall 104 shown in FIG. 20 is elongated in a width direction of the surface fastener and is disposed between adjacent segments, or groups, of surface fasteners. The lateral solid wall 104 prevents foaming resin from intruding between the fastener elements in a longitudinal direction. The height of the walls 104, 105 are slightly higher than the heights of the engaging elements surrounded by the walls 104, 105 to prevent the foaming resin from penetrating into the engaging elements zone. Examples of surface fasteners having these types of solid walls are disclosed in U.S. Pat. Nos. 5,061,540 and 5,766,723.

U.S. Pat. No. 5,061,540 describes a method of securely mounting and fixing the engaging element on the predetermined region of the convex face portion of the bottom face of the mold. In particular, in U.S. Pat. No. 5,061,540, a permanent magnet 108 (as shown in FIG. 21) is buried in the region of the mold adjacent to the portion on which the surface fastener is to be mounted, and a magnetic material 109 is formed in or attached to the base material of the surface fastener. Thus, when the surface fastener is positioned near the region of the mold having the magnet 108, the magnet 108 attracts the magnetic material 109 in the surface fastener toward the magnet 108.

The magnetic body 109 and the permanent magnet 108 may have a curved shape or a straight shape. For example, the permanent magnet 108 may be formed of a flexible material, such as a synthetic resin, having a ferrite magnet and a magnetic powder mixed therein, and the magnetic body 109 may be formed of a thin tape material and a wire made of steel. The magnetic body 109 may be integrally buried in the base material at the same time as molding of the surface fastener.

As described above, the longitudinal solid walls 105 of the surface fastener are described in U.S. Pat. Nos. 5,061,540 and 5,766,723, and these patents describe forming longitudinal walls 105 along the two longitudinal edges of the base material in a width direction on the face of the base material on which the engaging elements 103 are formed. The engaging elements are segmented into groups, defining zones of engaging elements, and the lateral walls 104 is positioned between these groups of engaging elements. Thus, the foaming resin material is prevented from intruding from the longitudinal and lateral directions due to the lateral and longitudinal solid walls 104, 105, respectively.

As noted above, in recent years, it has been popular to integrally mold the engaging elements and solid walls in succession and simultaneously on the surface of the base material by injecting or extruding a molten resin on a peripheral face of a die wheel that is rotatably driven in one direction. The peripheral face has many cavities for molding the engaging elements and the solid walls. However, if the molding surface fastener is to be long, the molding intervals of the lateral solid walls are determined by the number of rows of the engaging elements to be arranged between the lateral solid walls and an external diameter of the die wheel. Thus, repetition of a predetermined interval cannot be avoided.

On the other hand, to obtain a seating posture that is regarded as the most preferable posture from the viewpoint of ergonomics, a concave-convex face made by a moderate curved face is formed on a surface of a sheet for an automobile, for example. The shape of the concave-convex face, particularly the length thereof, is not fixed but varied. In addition, to obtain stability of the surface shape of the seat and stability of the seating posture, a plurality of linear recesses are formed so as to surround the peripheries of buttocks, a back portion, and a shoulder portion of the seat. In addition, the cushion body and the epidermis material are joined and integrated along the linear recesses. The male surface fastener member is integrated with the seat cushion body along the concave face portion of the seat of the seat cushion body having the concave-convex face and the liner recesses. Upon applying the epidermis material to the cushion body, pressure is applied to engage the female surface fastener zone on the inner surface of the epidermis material with the male engaging elements formed on the surface fastener.

Accordingly, the male surface fastener member needs to have a length corresponding to the length of the concave face portion of the cushion body, and the linear recess of various sized cushion bodies may have different lengths. Thus, it is necessary to cut the long male surface fastener into a required length depending on the length of the concave portion or linear recess of the cushion body. As a result, the long male surface fastener may be cut within the engaging element zone of the male surface fastener and not adjacent one of the lateral solid walls 104. When this occurs, the foaming resin material can intrude into the cut engaging element forming zone, which results in the engaging elements in this exposed area being buried in the foaming resin material, and the ability of the engaging elements in this zone to engage the female engaging material on the epidermis material is lost or compromised.

Particularly, in the conventional surface fasteners as disclosed in the above-described U.S. Pat. Nos. 5,061,540 and 5,766,723 and shown in FIG. 20, the spacing between the lateral solid walls 104 is limited by the spacing between the groups of engaging elements 103 formed on the surface of the base material 102 and the diameter of the die wheel, as noted above. Thus, the spacing of the lateral solid walls 104 is difficult to adjust to allow the fastener to be used in linear recesses having various different lengths. In addition, because engaging elements 103 cannot be formed on the base material 102 in the area of the lateral solid wall 104 and because engaging elements formed too close to the wall 104 would not be able to join effectively with corresponding female engaging elements, the effective engaging surface area of the surface fastener 110 is reduced by the thickness of the lateral solid walls 104 and an adequate amount of spacing between the lateral solid walls 104 and the rows of engaging elements 103 formed next to the walls 104. Thus, if the lateral solid walls 104 were positioned more closely together, the engaging force of the fastener member 110 would be reduced.

In addition, in many cases, a linear recess on the surface of the mold for forming the cushion body may be curved along a flat face of the mold in a direction that is substantially parallel with the surface of the cushion body. Prior art male surface fastener members are straight and are easily curved in a direction perpendicular to the surface of the base material so as to follow the linear recess. However, if the recess in the surface of the mold is curved in a width direction, the prior art male surface fastener member are not able to bend in the width direction of the base material to fit within the curved recess.

Therefore, for example, according to U.S. Pat. No. 6,656,563, short surface fastener strips are connected to each other via a hinge part that is flexible in a length direction, and the surface fastener strips are adjacent each other such that the surface fastener strips can be bent relatively in a horizontal direction for use in the curved linear recesses described above. Further, in the male surface fastener member described in U.S. Pat. No. 6,656,563, the foaming resin is prevented from intruding into the engaging element forming zone by a gasket formed around the perimeter of the face of the engaging element forming zone of the surface fastener strip or by providing a cover so as to cover the engaging element forming zone of the surface fastener strip.

The mold surface fastener member disclosed in U.S. Pat. No. 6,656,563 is manufactured by using a rotating die wheel on which various cavities are defined in a peripheral face thereof. The cavities define the shape of the engaging elements, the gasket, and the hinge. A molten resin is extruded or continuously injected toward the peripheral face of the rotating die wheel. These multiple cavities are arranged at predetermined intervals in the peripheral direction of the rotating die wheel and the axial direction thereof, which is a relatively complicated process and which results in increased manufacturing costs.

In addition, in some prior art surface fasteners, a cover is provided over the engaging elements of the surface fastener to prevent intrusion of the foaming resin into the areas between the engaging elements. This type of surface fastener requires an extra step of an operator having to remove the cover after the cushion body is formed to expose the engaging elements, which reduces the efficiency of the manufacturing process and increases installation costs, installation space, and waste.

SUMMARY OF THE INVENTION

Various embodiments of the present invention solve these various problems. In particular, various embodiments provide a male surface fastener that includes a normal mold surface fastener that can be successively molded in a tape-like shape, can be easily curved along a flat face of a flat-type base material in its length direction, can effectively prevent intrusion of a foaming resin material from a width direction and a longitudinal direction of the base material into an engaging element forming zone, and can achieve the maximum joining force with respect to a female surface fastener member.

Various embodiments of the invention are directed to a male surface fastener member that is configured for being integrated on a surface of a foaming resin mold body simultaneously with molding of the foaming resin mold body. The male surface fastener member comprises: (1) a plurality of male surface fastener strips connected with each other such that end portions of adjacent male surface fastener strips are opposed to each other along a longitudinal axis of the strips, each of the male surface fastener strips comprising a flat-type base material and a plurality of engaging elements integrally molded and extending upwardly from a first surface of the base material; and (2) a connecting portion having a width that is less than a width of the male surface fastener strips, the connecting portion being integrally formed with at least the end portions of at least two male surface fastener strips. The base material of the strips is formed of a first material and the connecting portion is formed of a second material, and the first material is different from the second material. In various embodiments, the end portions of the male surface fastener strips are relatively rotatable at least in the width direction of the flat-type base material about the connecting portion.

In certain embodiments, each male surface fastener strip further comprises: (1) first and second longitudinal resin intrusion prevention walls that are arranged adjacent the longitudinal side edge portions of the first surface, and (2) first and second substantially lateral resin intrusion prevention walls that extend upwardly from the first surface and along a width direction of the base material between the first and second longitudinal resin intrusion prevention walls. In addition, each of the lateral resin intrusion prevention walls comprises a plurality of engaging elements that are arranged in series in a width direction of the first surface, and the lateral resin intrusion prevention walls are spaced apart longitudinally along the first surface of the base material.

In a further embodiment, each of the longitudinal resin intrusion prevention walls comprises at least a first row of divisional wall portions and a second row of divisional wall portions that are disposed adjacent each other in the lateral direction. Each of the first and second rows of divisional wall portions comprises a plurality of wall portions, and each of the plurality of wall portions defines a gap therebetween in the longitudinal direction. The gaps between the divisional wall portions of the first row of divisional wall portions are offset in a lateral direction from the gaps between the divisional wall portions of the second row of divisional wall portions.

In a particular embodiment, each engaging element comprises: (1) at least an element main body having a rising portion rising from the first surface and an engaging head portion to be extended from an upper end of the rising portion toward a molding direction, and (2) a column portion integrally molded adjacent to the element main body in the width direction of the base material. The column portion has a height that is substantially equal to a height of an apex of the engaging head portion as measured from the first surface of the base material. In addition, the engaging elements are at least partially aligned such that a side surface of each engaging element is closely spaced apart with the side surface of the adjacent engaging element in the width direction of the base material.

In various embodiments, the connecting portion is a part of a continuous linear body having a flexibility, and the connecting portion is disposed substantially within a center portion in the width direction of the flat-type base material and is integrally buried in and extends in the longitudinal direction of the base material. In one particular embodiment, the linear body has a length sufficient to connect the plurality of male surface fastener strips in a longitudinal direction. Furthermore, in one embodiment, the linear body is a monofilament, and in another embodiment, the linear body is a film.

According to various embodiments, a male surface fastener member that is configured for being integrated on a surface of a foaming resin mold body simultaneously with molding of the foaming resin mold body comprises: (1) a plurality of male surface fastener strips connected with each other such that end portions of adjacent male surface fastener strips are opposed to each other along a longitudinal axis of the strips, wherein each of the male surface fastener strips comprising a flat-type base material and a plurality of engaging elements integrally molded and extending upwardly from a first surface of the base material; and (2) a connecting portion having a width that is less than a width of the male surface fastener strips. The connecting portion is integrally formed with at least the end portions of at least two male surface fastener strips, and each of the plurality of male surface fastener strips comprises first and second substantially lateral resin intrusion prevention walls, the first and second substantially lateral resin intrusion prevention walls extending upwardly from the first surface and along a width direction of the base material, and each of the lateral resin intrusion prevention walls comprises a plurality of engaging elements that are arranged in series in a width direction of the first surface.

In various other embodiments of the invention, a male surface fastener member that is configured for being integrated on a surface of a foaming resin mold body simultaneously with molding of the foaming resin mold body comprises: (1) a plurality of male surface fastener strips connected with each other such that end portions of adjacent male surface fastener strips are opposed to each other along a longitudinal axis of the strips, wherein each of the male surface fastener strips comprising a flat-type base material and a plurality of engaging elements integrally molded and extending upwardly from a first surface of the base material; and (2) a connecting portion having a width that is less than a width of the male surface fastener strips. The connecting portion is integrally formed with the male surface fastener strips such that the connecting portion extends the length of the male surface fastener member.

According to other various embodiments, a manufacturing method for forming a cushion body having at least one integrally molded male surface fastener member, the manufacturing method comprises the steps of: (1) molding a continuous male surface fastener formed in a tape-like shape; (2) forming a male surface fastener member from the continuous male surface fastener, the male surface fastener member comprising a plurality of male surface fastener strips cut from the continuous male surface fastener at predetermined intervals, the plurality of male surface fastener strips being connected with each other via a connecting portion formed integrally therewith such that end portions of adjacent male surface fastener strips are opposed to each other along a longitudinal axis of the strips, and each of the male surface fastener strips comprises a flat-type base material and a plurality of engaging elements integrally molded and extending upwardly from a first surface of the base material; (3) arranging the male surface fastener member in a mold for forming the cushion body, the first surface of the male surface fastener member being disposed to face and contact an inner face of the mold; (4) flowing a foaming resin into the mold for forming the cushion body; and (5) removing the foaming resin from the mold for forming the cushion body. The connecting portion has a width that is less than a width of the male surface fastener strips, and the connection portion is formed of a first material and the base material is formed of a second material, wherein the first material is different from the second material.

In certain embodiments, the step of forming the male surface fastener member from the continuous male surface fastener comprises the step of cutting, at predetermined longitudinal intervals, each male surface fastener strip from the continuous male surface fastener by removing portions of the continuous male surface fastener on each side of a center portion of the male surface fastener in a width direction while leaving the center portion of the base material between each male surface fastener strip. In one embodiment, the step of cutting each male surface fastener strip from the continuous male surface fastener comprises cutting a triangular shaped portion from each longitudinal side of the continuous male surface fastener. In another embodiment, the step of cutting each male surface fastener strip from the continuous male surface fastener comprises cutting a rectangular shaped portion from each longitudinal side of the continuous male surface fastener. In yet another embodiment, the step of cutting each male surface fastener strip from the continuous male surface fastener comprises cutting a arcuate shaped portion from each longitudinal side of the continuous male surface fastener. And, in another embodiment, the step of cutting each male surface fastener strip from the continuous male surface fastener comprises alternately cutting a first shaped portion from each longitudinal side of the continuous male surface fastener and a second shaped portion from each longitudinal side of the continuous male surface fastener. In a particular embodiment, the first shaped portion is rectangular and the second shaped portion is arcuate.

In various embodiment, the step of molding the continuous male surface fastener formed in the tape-like shape comprises the steps of: (1) rotating a die wheel in one direction, the die wheel having many cavities for molding engaging elements formed in a peripheral direction of a peripheral face; (2) extruding or injecting a molten resin material toward the peripheral face of the die wheel; (3) squeezing an extruded or injected molten resin material into the cavities for molding engaging elements and molding the continuous male surface fastener formed in the tape-like shape, the continuous male surface fastener comprising a continuous flat-type base material and engaging elements that extend upwardly from the flat-type base material; and (4) detaching the male surface fastener while the male surface fastener is being carried by the die wheel.

Further, various embodiments of the present invention are described below with typical examples, and the embodiments of the invention are not limited to those embodiments described below. Various modifications, such as change of design, are within the scope of the invention.

DESCRIPTION OF VARIOUS EMBODIMENTS OF THE INVENTION

Hereinafter, various embodiments of the invention are specifically described with reference to the drawings.

Figure 1:
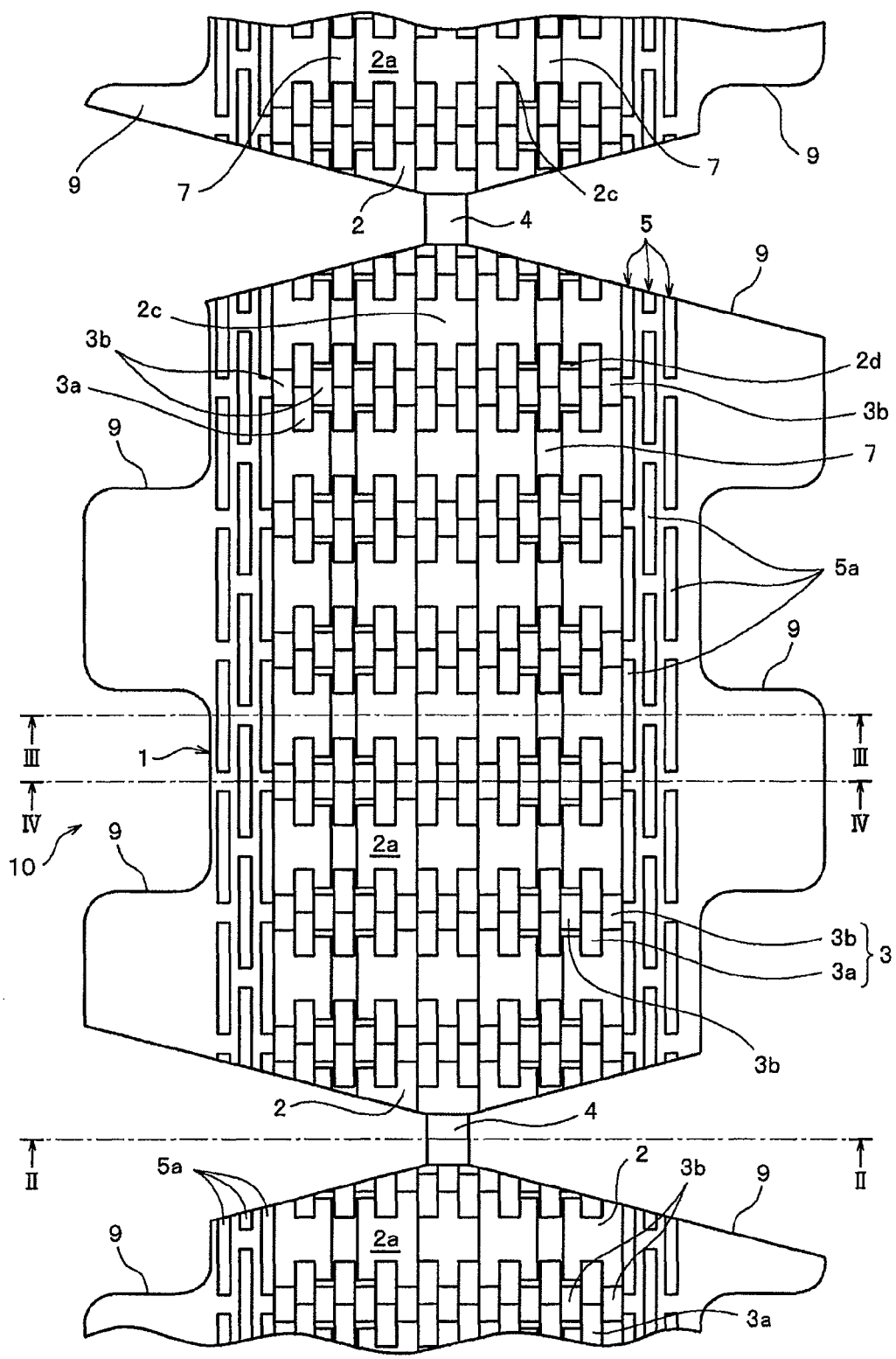
FIG. 1 is a plan view partially showing a male surface fastener member according to one embodiment of the invention.
Figure 2:
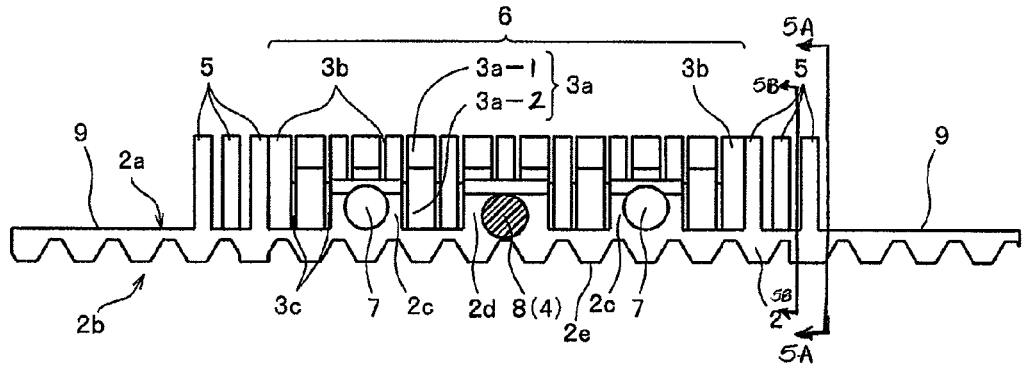
FIG. 2 is a cross sectional view taken through a line II-II of FIG. 1.
Figure 3:
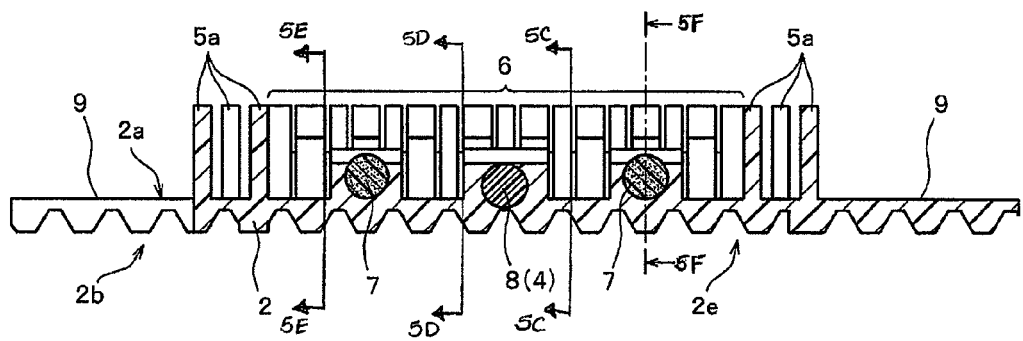
FIG. 3 is a cross sectional view taken through a line III-III of FIG. 1.
Figure 4:
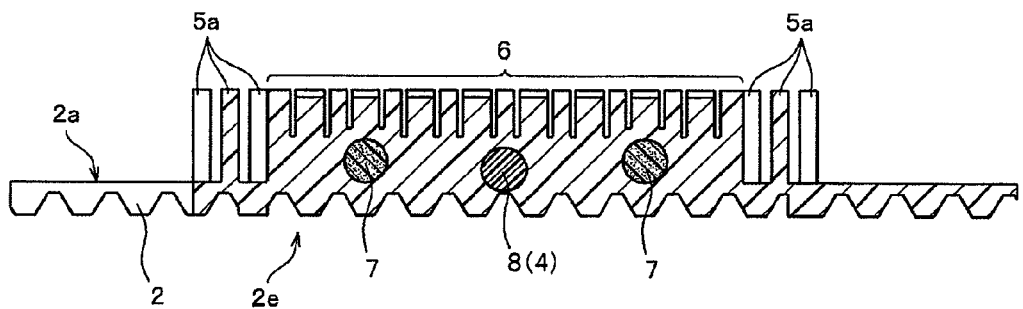
FIG. 4 is a cross sectional view taken through a line IV-IV of FIG. 1.
Figure 5A:
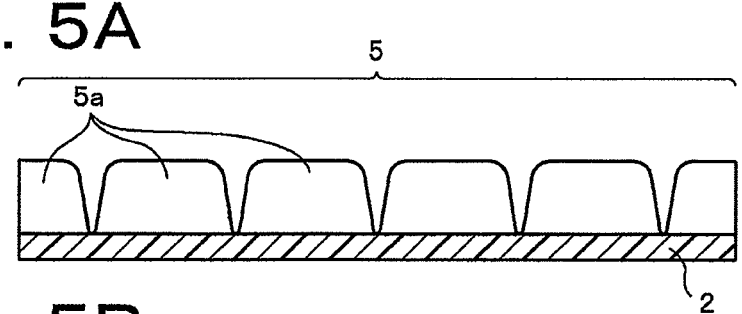
FIG. 5A is a side view of a divisional wall portion of the male surface fastener member shown in FIG. 1 as viewed from line 5A-5A of FIG. 2.
Figure 5B:
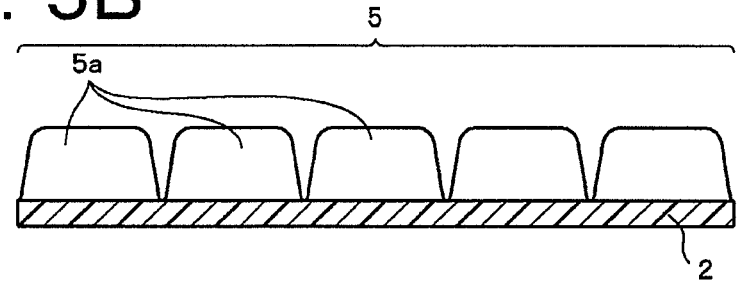
FIG. 5B is a side view of a divisional wall portion of the male surface fastener member shown in FIG. 1 as viewed from line 5B-5B of FIG. 2.
Figure 5C:
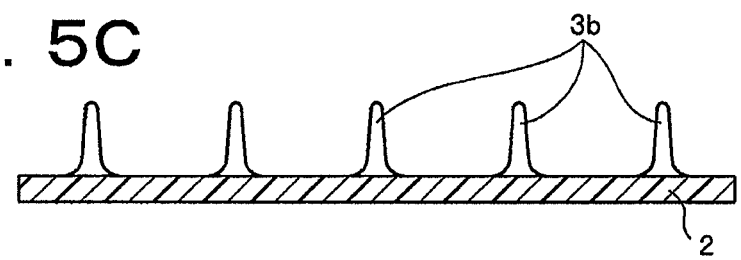
FIG. 5C is a side view of engaging elements of the male surface fastener member shown in FIG. 1 as viewed from line 5C-5C of FIG. 3.
Figure 5D:
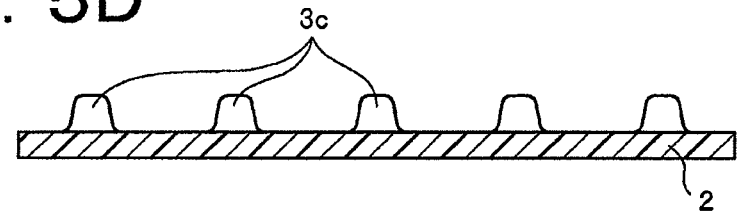
FIG. 5D is a side view of engaging elements of the male surface fastener member shown in FIG. 1 as viewed from line 5D-5D of FIG. 3.
Figure 5E:
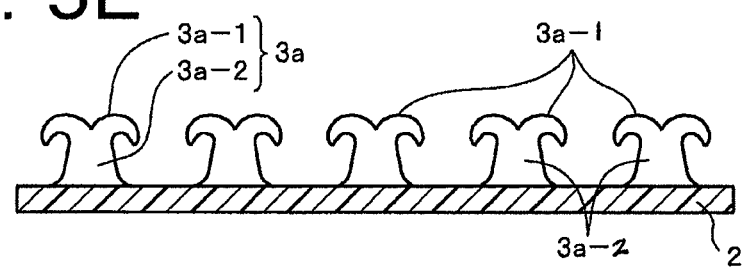
FIG. 5E is a side view of engaging elements of the male surface fastener member shown in FIG. 1 as viewed from line 5E-5E of FIG. 3.
Figure 5F:
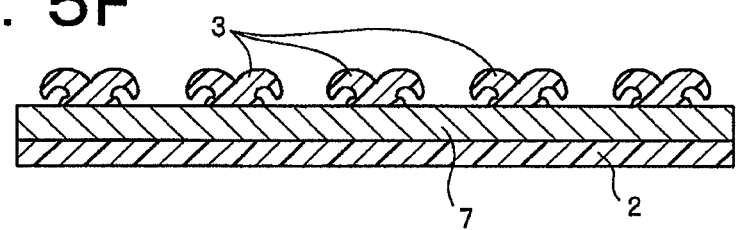
FIG. 5F is a cross-sectional view of the male surface fastener member shown in FIG. 1 as taken through line 5F-5F of FIG. 3.

FIGS. 1 to 4 show a first embodiment of the invention. FIG. 1 is a partial plan view showing a part of a male surface fastener according to the first embodiment while notching a part of the male surface fastener. FIG. 2 is a cross sectional view taken through the II-II line of FIG. 1. FIG. 3 is a cross sectional view taken through the III-III line of FIG. 1. FIG. 4 is a cross sectional view taken through the IV-IV line of FIG. 1. In addition, FIG. 5A is a partial side view of first and third wall portions, which are parts of a first resin intrusion prevention wall of the male surface fastener. FIG. 5B is a partial cross sectional view of a second wall portion. FIG. 5C is a side view of a column portion, which is a part of a component part of an engaging element. FIG. 5D is a side view of a space portion, which is arranged in close contact between the column portion and the main body of the engaging element. FIG. 5E is a side view of the main body of the engaging element. FIG. 5F is a cross sectional view taken through the V-V line of FIG. 3.

Male Surface Fastener Member

As shown in FIGS. 1 to 5F, a male surface fastener member 10 according to this embodiment is configured by connecting the end portions of a plurality of male surface fastener strips 1 in a longitudinal direction via a connection portion 4. The male surface fastener strip 1 has an engaging element zone on which many engaging elements 3 are formed. The engaging elements 3 extend upwardly from a first surface 2a of a flat-type base material 2 in rows in a width direction and a longitudinal direction of the base material 2, and longitudinal resin intrusion prevention walls 5 for preventing foaming resin from intruding into the zone of engaging elements 3 from the right and left side (longitudinal) edges of the base material 2. The first longitudinal resin intrusion prevention wall 5 extends upwardly from the first surface 2a adjacent a first longitudinal edge and the second longitudinal resin intrusion prevention wall 5 extends upward from the first surface 2a adjacent a second longitudinal edge of the first surface 2a.

According to the embodiment shown in FIG. 1, each engaging element 3 has an element main body 3a and a column portion 3b. The element main body 3a comprises a rising portion 3a-2 and an engaging head portion 3a-1 elongated from the upper end of the rising portion 3a-2 in a lateral direction, which is shown in FIG. 5E. As shown in FIG. 5C, the column portion 3b has substantially the same height as that of the element main body 3a and is arranged to be integrated with the element main body 3a and in close contact with the side surface of the element main body 3a. In particular, as shown in FIGS. 2 and 5D, a space portion 3c has a low height and a thin thickness, and the space portion 3c is arranged in close contact between each adjacent column portion 3b and element main body 3a.

According to the embodiment shown in FIGS. 1-5F, the connecting portion 4 includes a linear body 8 and is a monofilament made of a long, flexible synthetic resin material, which is described in more detail later. The linear body 8 is integrally buried in a longitudinal direction so as to penetrate through a block-shaped projecting portion 2d that is formed integrally with the base material 2. The block-shaped projecting portion 2d extends upwardly from the first surface 2a of the base material 2 and in a longitudinal direction adjacent a center portion in a width direction of the flat-type base material 2. The connecting portion 4 has length sufficient to connect a plurality of male surface fastener strips 1 that are arranged in an end-to-end relationship along the longitudinal axes of the male surface fastener strips 1. In the embodiment shown in FIG. 1, the connecting portion 4 is exposed between the end portions of respective male surface fasteners strips 1.

However, the connecting portion 4 is not limited to the long monofilament made of a synthetic resin as described above. As described later, the connecting portion 4 may be a short monofilament made of a synthetic resin having enough length to connect the end portions of two adjacent male surface fastener strips 1, or the connecting portion 4 may be a strip made of the same material and same configuration as the male surface fastener strips 1 that is narrower than the strips 1 and is integrally formed with the adjacent male surface fastener strips 1. Alternatively, the connecting portion 4 may be a small plate strip made of metal or a synthetic resin to connect the end portions of the adjacent male surface fastener strips 1 with each other. In other alternative embodiments, in place of the monofilament made of a synthetic resin, a monofilament made of a synthetic resin including a magnetic material (e.g., an iron powder, a nickel powder, a cobalt powder, or a magnet powder) and a metal wire having a magnetic property (e.g., Fe, Ni, and Co) can be adopted. The metal wire may include a single metal wire or a combination of metal wires.

Each longitudinal resin intrusion prevention wall 5 includes a plurality of rows of intrusion prevention walls 5, which extend in a longitudinal direction along the right and left longitudinal side edges of the male surface fastener strip 1. Each of the longitudinal resin intrusion prevention walls 5 include a plurality of divisional wall portions 5a, which are divided at predetermined pitches in the longitudinal direction. According to the present embodiment, as shown in FIG. 1, the longitudinal resin intrusion prevention walls 5 are arranged along the edges on the right and left sides, and each wall 5 includes three adjacent rows that are spaced apart in the width direction. Respective divisional wall portions 5a of each of the three rows of the longitudinal resin intrusion prevention walls 5 are adjacent each other in a length direction and are arranged in a zig-zag manner so as to seal a gap between adjacent rows of divisional wall portions 5a in the width direction. Specifically, the outermost row of divisional wall portions 5a includes gaps between the wall portions 5a, and the adjacent row of divisional wall portions 5a includes gaps that are offset in the longitudinal direction from the gaps in the outermost row. In addition, the height of the longitudinal resin intrusion prevention walls 5 as measured from the base plate 2 is substantially equal to the height of the apex of the engaging elements 3 as measured from the base plate 2.

As noted above, a longitudinal gap formed between adjacent rows of the first resin intrusion prevention walls 5 and a width gap formed between adjacent divisional wall portions 5a creates a passage for the foaming resin material that is injected into the inside of a mold (not illustrated). The foaming resin material slowly intrudes from a width direction of the male surface fastener member 10 toward the engaging element 3 forming zone through the longitudinal gap between the walls 5 after sneaking through the width gaps between the divisional wall portions 5a. However, because there are multiple rows of divisional wall portions 5a that are disposed in an offset relationship with the adjacent row, the foaming resin material cures before it passes through the innermost longitudinal resin intrusion prevention wall 5 (i.e., wall that is nearest to the engaging element forming zone). Accordingly, the foaming resin material at least partially surrounds, joins, and firmly fixes the divisional wall portions 5a without reaching the engaging element forming zone. In other words, the lower surface 2b and a portion of the first (or upper) surface 2a of the base material 2 are buried into the foaming resin mold product when the foaming resin material seeps around the second (or lower) surface 2b of the base material 2 toward the first surface 2a of the base material 2 and into the gap between the divisional wall portions 5a of the outermost (in the width direction) longitudinal resin intrusion prevention wall 5. This seeping of the foaming resin material into a portion of the wall 5 allows the male surface fastener member 10 to be fixed more firmly to the foaming resin material.

Further, without regard to the wall made of the same material as the flat-type base material 2, for example, in other alternative embodiments, the first intrusion prevention wall 5 may be a wall made by a string-like body as described in U.S. Pat. No. 6,939,596, and a sealing property of the first intrusion prevention wall 5 may be improved by continuing a linear magnetic body or a string-like body in a length direction of the base material 2 along the vicinity of the upper ends of the right and left intrusion prevention wall portions as described in PCT/JP2008/070207 and PCT/JP2008/064154.

The engaging element forming zone includes many engaging elements 3 that extend upwardly from the base material 2 and are vertically arranged to make many rows in a width direction and a longitudinal direction of the base material 2. According to the embodiment shown in FIG. 1, the side faces of the engaging elements in a particular row are arranged closely to each other in a width direction of the base material 2 so as to define lateral rows of engaging elements, and the lateral rows are spaced apart from each other in the longitudinal direction of the base material 2. According to various embodiments, the lateral rows extend along a width direction, and many engaging elements 3 are disposed closely with each other such that the gap between adjacent engaging elements 3 is formed to prevent the flow of foaming resin therethrough. For example, in various embodiments, the gap between the side face of a column portion 3b and the side face of an adjacent element main body 3a is about 0.01 mm to about 1.0 mm, and in the particular embodiment shown in FIG. 1, the gap is about 0.1 mm. According to various embodiments of the invention, the closely-spaced row of the above-described engaging elements 3 becomes the second resin intrusion prevention wall 6, which prevents the foaming resin material from intruding in a longitudinal direction of the male surface fastener strip 1 into the engaging element forming zone.

As shown in FIGS. 2 to 4, the second resin intrusion prevention wall 6 according to various embodiments includes many engaging elements 3 closely arranged in rows. The rows of engaging elements 3 extend between the right and left first resin intrusion prevention walls 5 along the width direction, and the ends of the second resin prevention wall 6 are arranged adjacent the innermost row of the first resin intrusion prevention walls 5. According to one embodiment, this arrangement increases the number of the engaging elements 3 and the density of the engaging elements 3 as compared to conventional surface fasteners. Accordingly, the joining force between the male surface fastener member 10 and the female surface fastener on the epidermis material is increased from the joining force of conventional surface fasteners. Further, for example, even when the male surface fastener member 10 is cut into an arbitrary length in the vicinity of the end edge of the male surface fastener member 10 in a longitudinal direction, the lateral row of the engaging elements 3 composing the second resin intrusion prevention wall 6 prevents the foaming resin material from intruding in a longitudinal direction. Therefore, it becomes possible to cut the male surface fastener member 10 at any point along the length of the male surface fastener member 10 and in any shape without significantly compromising the ability of the male surface fastener member 10 to resist intrusion of the foaming resin into the engaging element 3 zone.

In the embodiment shown in FIG. 1, the second resin intrusion prevention wall 6 is partially divided in a width direction, and the divided gaps are located at intervals that are not large enough to allow the foamed resin to intrude. However, in various other embodiments, it is not always necessary for the second resin intrusion prevention wall 6 to be divided. For example, the second resin intrusion prevention wall 6 may be a continuous wall that substantially covers the entire surface 2a of the base material 2. In addition, in various alternative embodiments, it is not necessary that the material used to make the second resin intrusion prevention wall 6 is the same as the material(s) used to make the base material 2. For example, by arranging a member that is softer than the base material, such as a string or an elastomer, along the upper face of the second resin intrusion prevention wall 6, a sealing property of the second resin intrusion prevention wall 6 can be improved.

The engaging head portion 3a-1 of the element main body 3a according to the embodiment in FIG. 5E is formed in a bilobed hook shape, which extends upwardly from the rising portion 3a-2 and is curved and extended in the longitudinal directions from the upper end of the rising portion 3a-2. Further, according to various embodiments, the shape of the engaging head portion is not limited to the above-described shape, and any suitable shape for an engaging element, such as a mushroom-shape or a single hook shape, can be adopted, for example.

Further, according to various embodiments, the male surface fastener member 10 includes one or more linear magnetic bodies 7, and the embodiment shown in FIG. 1 includes two linear magnetic bodies 7. The linear magnetic bodies 7 are elongated in a longitudinal direction and are integrally fusion-bonded to the base material 2. A first linear magnetic body 7 is disposed within the forming zone of the engaging elements 3 near the right side edge portion of the flat-type base material 2, and a second linear magnetic body 7 is disposed within the forming zone of the engaging elements 3 near the left side edge portion of the flat-type base material 2. The linear magnetic body 7 may include at least one metal selected from among iron, cobalt, nickel, or the like, or a monofilament made of a synthetic resin material having a magnetic powder made of an alloy of one of these metals. According to this embodiment, if a magnet is mounted on the foaming resin molding body as described above, the linear magnetic body 7 is disposed on the foaming resin molding body adjacent the magnet. However, a narrow, tape-shaped metal foil can be used in place of the linear magnetic body 7 according to various alternative embodiments.

When the magnet is not mounted on the foaming resin molding body, there is not a magnetic body on the molding body to attract the linear magnetic body 7. Thus, a linear or a tape-shaped magnet may be directly secured to the base material 2 of the male surface fastener member 10. In addition, according to various other embodiments, which are described later, the above-described linear magnetic body 7 can be omitted by using a monofilament having the magnetic powder mixed therein or a metal wire having a magnetic property as the connecting portion 4.

According to the embodiment shown in FIGS. 1 and 2, thick portions are intermittently formed in a longitudinal direction in the zone of the base material 2 in which the linear magnetic bodies 7 are integrated. This arrangement unifies the thickness of the base material 2 in the vertical direction, exposes a part of the linear magnetic bodies 7 from a surface of the base material 2, and provides strength to the base material 2. Thus, even if a slight external force is received by the male surface fastener member 10, the linear magnetic bodies 7 can be easily cut and separated from the base material 2.

According to a specific method for forming the thick portion of the base material, as shown in FIG. 2, a block-shaped projecting portion 2c is intermittently molded along a longitudinal row of the engaging element 3 on each of the right and left side edge portions of the base material 2 upon molding of the male surface fastener member 10. The linear magnetic body 7 is allowed to penetrate through a longitudinal direction of the projecting portion 2c, and the linear magnetic body 7 is integrally buried with a part of the upper face of the linear magnetic body 7 being intermittently exposed to the outside. The linear magnetic body 7 that is mounted in the base material 2 in this way makes positioning and fixing of the male surface fastener member 10 on a predetermined position of the mold more accurate and reliable. This positioning and fixing is facilitated by using a magnetic attractive force effected by a magnet (not illustrated) that is mounted on the mold (not illustrated) of the foaming resin molding body.

The linear magnetic body 7 according to this embodiment may include not only a linear magnetic bodies having circular cross sections, but they may also be tape-like, thin metal plates, for example, or the magnetic bodies can be separately mounted. Further, the magnetic body having a magnetic force may be available in place of the magnetic body to be attracted by a magnetic force. In addition, the magnetic body or a magnet can be attached to the male surface fastener member 10, for example, by applying a magnetic resin, such as a resin bonding agent or a resin paint having a magnetic powder, onto the lower surface of the base material 2 to form a magnetic coating layer. Alternatively, the magnetic powder may be mixed into any of the base material 2, the engaging elements 3, the first resin intrusion prevention wall 5, or the lateral wall portion (the engaging element row) serving as the second resin intrusion prevention wall 6. In another alternative embodiment, the resin layer having the magnetic powder is subject to laminate processing on the upper surface of the first resin intrusion prevention wall 5 and the upper surface of the lateral wall portion. In addition, as described above, application of the processes is not limited to a magnetic body but the same process can be applied to a magnet body.

In addition, a monofilament, which is one piece of the linear body 8 made of synthetic resin, is continuously buried within the base material 2 substantially adjacent the center of the base material 2 in the width direction. To completely bury the linear body 8 in the base material 2, of which vertical thickness is limited, the thickness of the linear body 8 is narrower than the thickness of the base material 2. Therefore, according to the embodiment shown in FIG. 1, to integrally bury the linear body 8 into the base material 2, a projection string 2d is continuously molded in the longitudinal direction and, as shown in FIG. 1 and FIGS. 2 to 5, the linear body 8 penetrates through the inside of the projection string 2d. Accordingly, the linear body 8 is integrally buried in the base material 2.

Furthermore, according to the embodiment shown in FIG. 1, a fin-like strip 9 is intermittently molded and integrated in the longitudinal direction along the right and left side edges of the base material 2. In addition, as shown in FIGS. 2 to 4, a concave-convex, or wave-shaped, face 2e is formed on a second surface 2b of the base material 2. The fin-like strip 9 and the concave-convex face 2e are formed to increase the surface area for receiving and bonding with the foaming resin material upon molding of the foaming resin mold body, thus providing an anchor effect by buried in the foaming resin mold body.

Manufacturing Process

The male surface fastener member 10 having the above-described structures may be manufactured according to various manufacturing processes. In one embodiment, the basic method disclosed in U.S. Pat. No. 5,620,769 can be adopted for manufacturing the male surface fastener member 10. U.S. Pat. No. 5,620,769 is herein incorporated by reference in its entirety. Without repeating the disclosure in this patent, the inventors have provided a brief description of an exemplary apparatus and method for manufacturing the male surface fastener member 10 according to the various embodiments described herein.

In particular, to manufacture the male surface fastener member 10 according to various embodiments, an apparatus and method that are the same as those described in U.S. Pat. No. 5,620,769 are used. Thus, a male surface fastener 10' is manufactured initially into a long, continuous, tape-like shape. Subsequently, the male surface fastener 10' is cut for each length for which the male surface fastener strip 1 is manufactured. In various embodiments, each of the male surface fastener strips 1 may be cut such that the strips 1 are completely separated from each other. In other embodiments, the male surface fastener strips 1 may be cut such that the connecting portion 4 remains between adjacent male surface fastener strips 1. For example, according to one embodiment, the male surface fastener member 10 shown in FIG. 1 is formed in a long, continuous, tape-like shape, and the male surface fastener 10' is then cut at regular length intervals in a lateral direction such that the connecting portion 4 is left intact and joins adjacent male surface fastener strips 1 separated by the cutting step. The connecting portion 4 of the male surface fastener member 10 may be completely cut to achieve a male surface fastener member 10 that has a certain overall length from the outer longitudinal edge of the first male fastener strip 1 to the outer longitudinal edge of the last male fastener strip 1.

Figure 6:
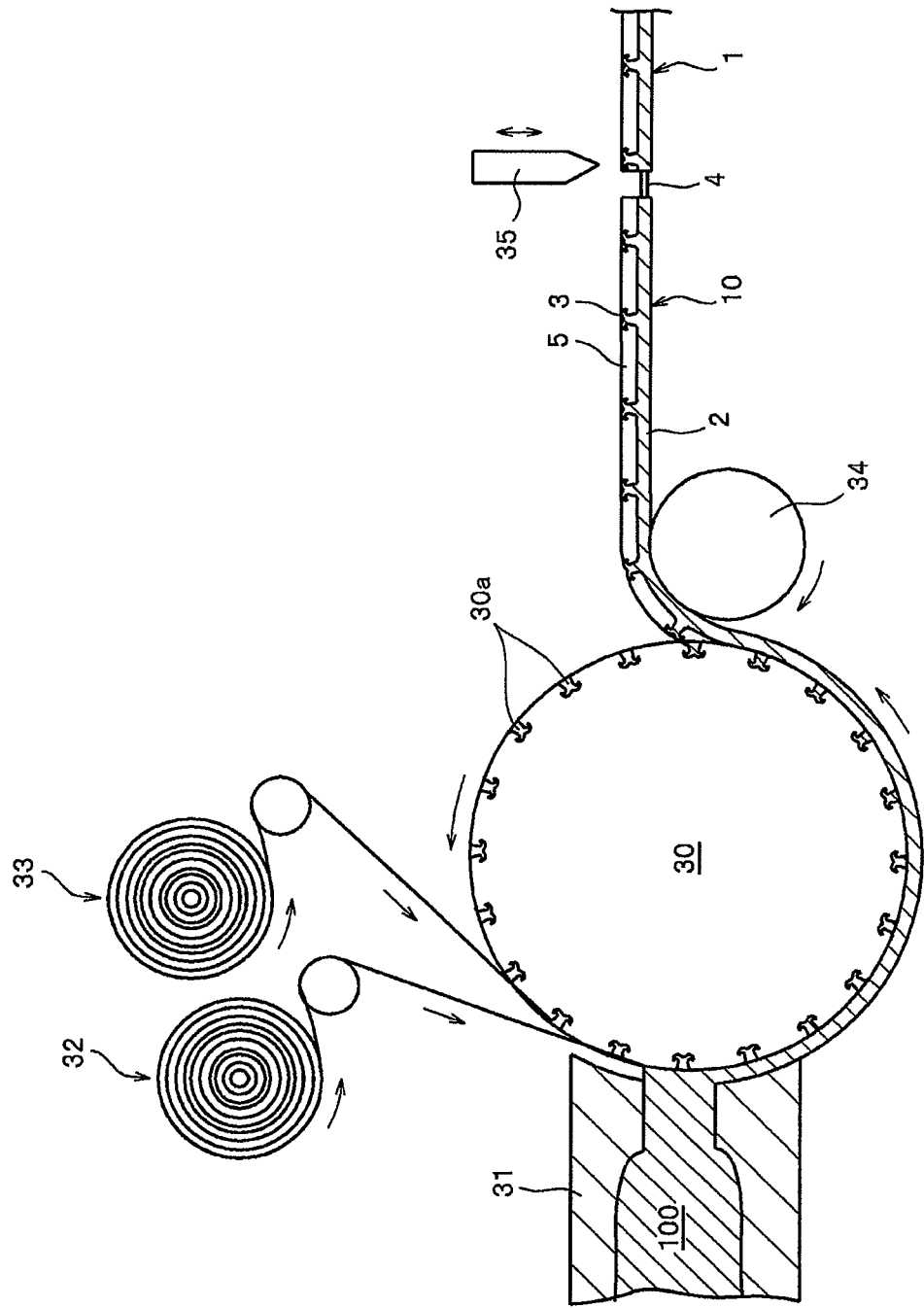
FIG. 6 is a schematic diagram of an exemplary manufacturing process for forming the male surface fastener member according to one embodiment.

FIG. 6 illustrates an exemplary method of manufacturing the male surface fastener member 10 described above in FIG. 1. In particular, the method begins with placing a continuous injection nozzle 31 for dispensing a molten resin toward a peripheral face of a die wheel 30, which is driven and rotated in one direction. In the center zone of the peripheral face of the die wheel 30, many cavities 30a for molding the engaging elements 3 are formed, and cavities for molding plural rows (e.g., three rows) of the divisional wall portion 5a are formed along each of the right and left edge portions of the peripheral face. These cavities for molding the divisional wall portion 5a are extended intermittently in a peripheral direction (the illustration thereof is herein omitted). On the other hand, on the upstream side in the rotational direction of the peripheral face region of the die wheel 30, which is equivalent to the position opposed to the injection nozzle, continuous supplying portions 32 and 33 for supplying the linear magnetic body 7 and the linear body 8 made of a synthetic resin are provided. From the continuous supplying portion 32, two pieces of the linear magnetic bodies 7 are continuously supplied to a first portion and a second portion of the engaging element forming zone, wherein the first portion is between the right edge and the center and the second portion is between the left edge and the center. The continuous supplying portion 33 continuously supplies one piece of the linear body 8 made of synthetic resin to a portion of the engaging element zone that is substantially in the center of the zone in the width direction. The continuous supplying portions 32, 33 supply the respective bodies 7, 8 toward the opposed position with respect to the injection nozzle 31 of the die wheel 30.

A cooling liquid is passed through the inside of the die wheel 30 to cool the die wheel 30. Furthermore, the lower half part of the die wheel 30 is soaked into a cooling liquid tank (not illustrated) that is arranged below. In addition, a take-up roll 34 of the male surface fastener 10' is provided, and on the downstream side thereof, a cutting blade 35 for cutting the molded male surface fastener 10' for each predetermined interval is arranged. The cutting blade 35 is intermittently activated via an actuating device (not illustrated).

In a continuous manufacturing apparatus of the male surface fastener member 10 provided with the above-described structure, a molten resin material 100 is continuously injected from the continuous injection nozzle 31 toward the peripheral face of the die wheel 30. In this case, the die wheel 30 is driven and rotated in one direction, the molten resin material 100 to be injected to the peripheral face continuously molds the base material 2 of the surface fastener at a gap between the injection nozzle 31 and the die wheel 30, and at the same time, the molten resin material 100 molds the engaging element 3, the first resin intrusion prevention wall 5, and the divisional wall portions 5a, respectively, in each of the above-described cavities in series. During the molding period, the liner magnetic body 7 and the linear body 8 made of a synthetic resin are introduced from the position nearer to the upstream side in a rotational direction of the die wheel 30 than the injection position of the molten resin material 100.

According to various embodiments, the molten resin material 100 used to form the base material 2 may be any thermoplastic polymeric material such as, for example, polyethylene, polypropylene, polyester, nylon, polybutylene terepthalate (PBT), and copolymers thereof. In addition, various embodiments of the linear body 8 may be formed of any thermoplastic polymeric material, such as, for example, polyethylene, polypropylene, polyester, nylon, PBT, and copolymers thereof.

In certain embodiments, the linear body 8 is made of a first material and the base material 2 is made of a second material that is different from the first material. For example, in one particular embodiment, the resin utilized for the molten resin material 100 is PBT, and the resin utilized for the linear body 8 is polyester. However, in other various embodiments, the linear body 8 and the base material 2 may be formed of the same material.

According to one embodiment, on the peripheral face of the die wheel 30, two pieces of linear magnetic body guiding grooves (not illustrated) are intermittently formed for exposing substantially one-third of the cross section of the linear magnetic body 7 from the surface of the die wheel 30 to the surface of the base material. In addition, one piece of a linear body guiding groove (not illustrated) is continuously formed in a peripheral direction for receiving the linear body 8.

Accordingly, as described above and as shown in FIG. 6, the male surface fastener 10' formed into a continuous tape-like shape to be molded on the peripheral face of the die wheel 30 is held on the peripheral face of the die wheel 30 and carried about a half diameter in accordance with the rotation of the wheel 30. The male surface fastener 10' is cooled and solidified during this carriage. Then, the male surface fastener 10' is torn from the peripheral face of the die wheel 30 by the take-up roll 34 or the like, and the male surface fastener 10' is sent to a cutting step and a winding step thereafter (not illustrated). As a result, a male surface fastener member 10, which is a long finished product, such as the embodiment shown in FIG. 1, has a plurality of male surface fastener strips 1 connected together via the connecting portion 4. According to the embodiment shown in FIG. 1, a part of the synthetic resin monofilament that is the linear body 8 buried substantially in the center in a width direction of the base material 2 is used as the connecting portion 4. Thus, the connecting portion 4 is integrally formed with the base material 2 of the plurality of male surface fastener strips 1.

In addition, according to the embodiment shown in FIG. 1, the lower surface 2b of the base material, which is opposite the upper surface side 2a on which the engaging elements 3 are formed, is molded into a concave-convex face 2e, which is shown in FIGS. 2-4. However, in other various embodiments, the lower surface 2b may be formed into a flat face.

To cut the continuous male surface fastener 10' such that the male surface fastener strips 1 remain connected by the connecting portion 4, a cutting blade 35 is intermittently moved up and down to cut right and left zones in the width direction of the base material 2 into an isosceles-triangular shape, leaving the connecting portion 4 as a part of the linear body 8 made of a synthetic resin (a monofilament) with a predetermined length between the adjacent male surface fastener strips 1. To remove the base material portion covering the monofilament portion that forms the connecting portion 4, a die (not illustrated) is provided that has a cut shape of the continuous male surface fastener 10' for cutting the above-described base material portion at the same time and leaving a part of the linear body 8 on the lower part of a passage of the continuous male surface fastener 10' opposed to the cutting blade 35.

Methods of Use

Figure 7:
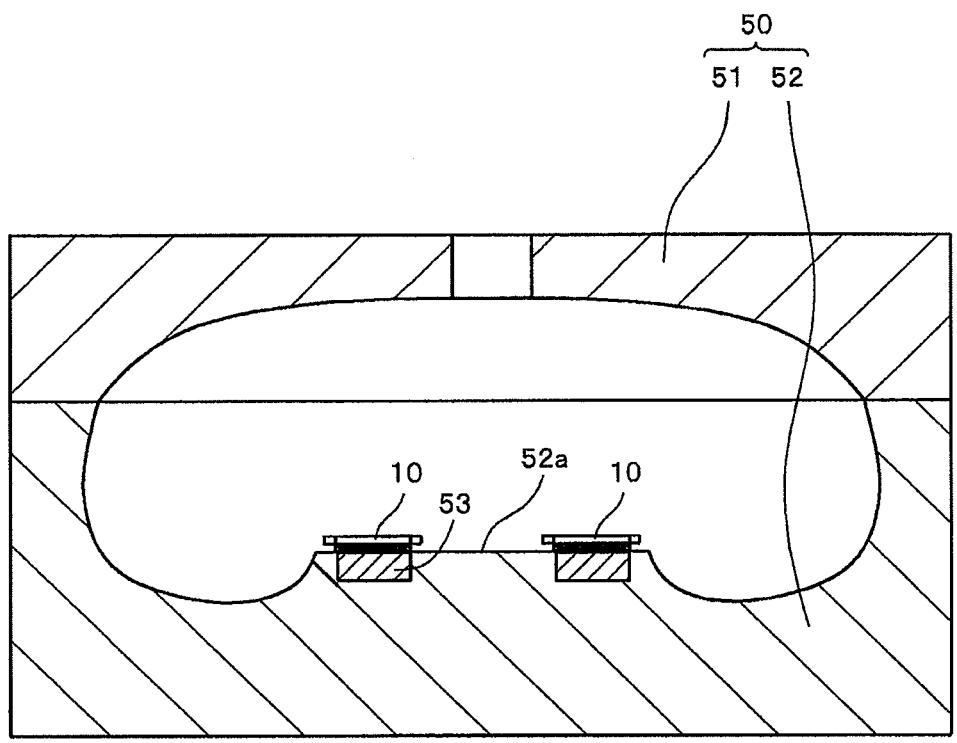
FIG. 7 is a sectional view showing the male surface fastener member mounted and fixed in a mold for molding a foaming resin mold body according to one embodiment.

To integrally mold the male surface fastener member 10 that is manufactured in this way according to the embodiment shown in FIG. 1 into a cushion body made of a foaming resin material (not illustrated), for example, as shown in FIG. 7, the male surface fastener member 10 is mounted and fixed in a cushion body molding mold 50 provided with an upper mold 51 and a lower mold 52 with the engaging element forming face of the male surface fastener member 10 faced to a part of the cushion body molding mold 50. According to this embodiment, the projecting face 52a for forming a recess face to be formed on the seat of the cushion body is formed on the center of the lower mold 52, and the male surface fastener member 10 is mounted and fixed to the projecting face 52a. To mount and fix the male surface fastener member 10 to the projecting face 52a, according to one embodiment, a magnet 53 is buried in the zone of the projecting face 52a of the lower mold 52 and the magnet 53, and the linear magnetic bodies 7 that are buried in the male surface fastener member 10 is attracted to the magnet 53 so as to position (align) and fix the male surface fastener member 10 at a predetermined position on the projecting face 52a.

Next, the foaming resin material is injected into the inside of the mold 50 to be distributed through the entire inside of the mold 50. The foaming resin material flows over the second surface 2b of the male surface fastener member 10, around the fins 9, and to the periphery of the plural rows of engaging elements 3, the longitudinal resin intrusion prevention walls 5, and the outer lateral resin intrusion prevention walls 6 of the male surface fastener member 10. Foaming is started during this flow. In this case, the male surface fastener member 10 is positioned and fixed by an attractive effect of the magnet 53 of the molding mold 50, and the position of the male surface fastener member 10 relative to the magnet 53 remains substantially the same despite the flowing pressure and foaming pressure of the foaming resin material. In addition, the foaming resin material flowing as described above tries to intrude from a width direction of the male surface fastener member 10 into the forming zone of the engaging elements 3 through the gap formed between the arranged plural rows of the first resin intrusion prevention walls 5 and the gap formed between respective divisional wall portions 5a. However, the foaming resin material is foamed and solidified before it reaches the engaging element forming zone, being interrupted by the arranged plural rows of the first resin intrusion prevention walls 5 and respective divisional wall portion 5a of the longitudinal resin intrusion prevention wall 5. Therefore, the foaming resin material cannot reach the engaging element forming zone.

Figure 10:
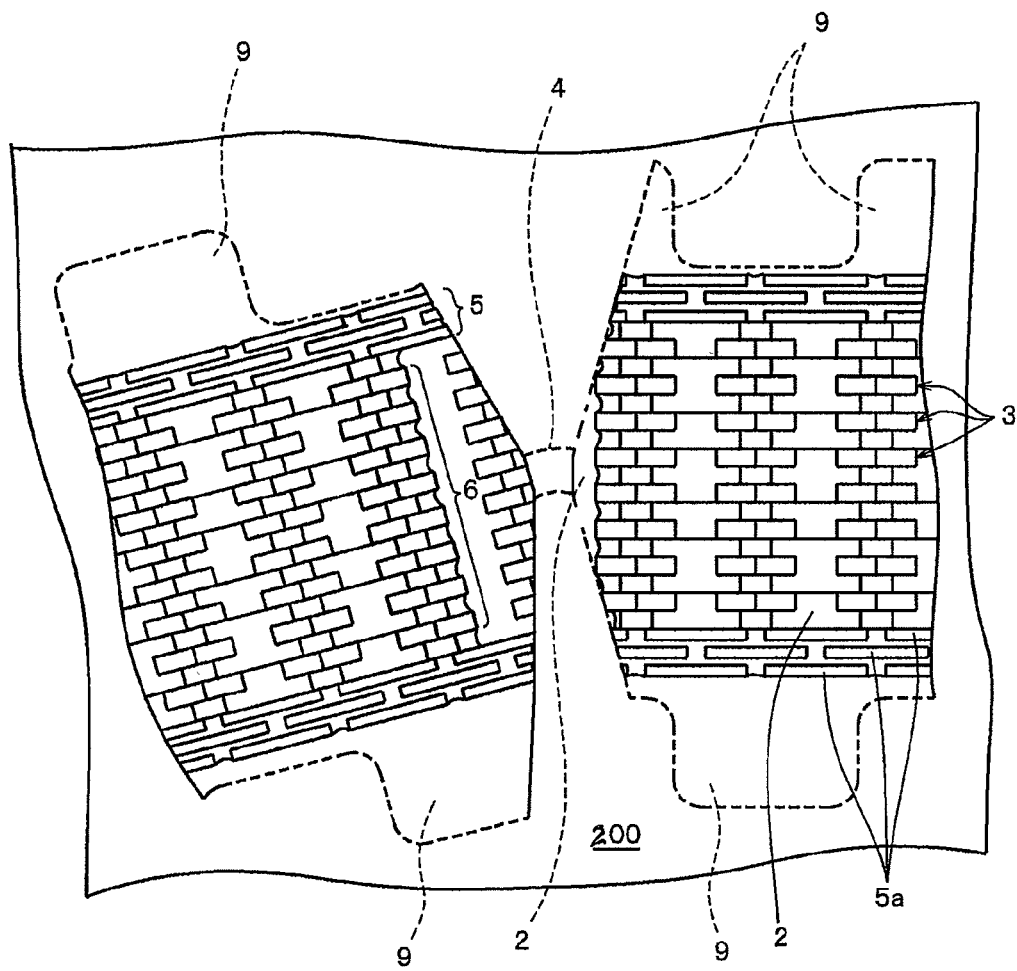
FIG. 10 is a partial plan view showing the male surface fastener partially buried in the foaming resin mold body according to one embodiment.

Furthermore, the male surface fastener 10' may be cut based on the intended use of the fastener 10', as described above, and in various cases, as shown in FIG. 10, a part of the lateral row of the engaging elements 3 may be cut. However, according to the embodiment shown in FIG. 10, the lateral row 6 of the engaging elements 3 is molded at forming intervals of a normal lateral row of the engaging elements 3, so that a foaming resin material 30 merely reaches one or two rows of the engaging elements at the most, as shown in FIG. 10, due to close proximity of the side surfaces of the engaging elements 3 to each other, creating the lateral resin intrusion prevention wall 6.

Thus, the epidermis material covers the cushion body having the surface fasteners 1 and is integrally secured to the portions of the cushion body having the surface fasteners 1. By pressing the attaching portion of each surface fastener 1 to engage the surface fastener 1 with the female engaging element on the inner surface of the epidermis material, the epidermis material can be tightly attached to the cushion body and closely contact the curved face without floating away from the cushion body.

According to various embodiments of the invention, the lateral row of the engaging elements 3 that form the lateral wall portion 6 is not flat, but includes substantially the same number of engaging elements 3 as a normal engaging element row such that the lateral row 6 of the engaging elements are fastened with the female engaging elements formed on the inner surface of the epidermis material across nearly the entire face of the male surface fastener member 10. This arrangement dramatically improves the engaging strength of the lateral row of the engaging elements. As a result, even if a force in a displacement direction is applied to the seating portion of the epidermis material, the lateral row of the engaging elements can not be detached easily, and further, the cushion body is not damaged by the engagement of the male surface fastener member 10 and the female engaging element on the epidermis material because the engagement can sustain a slight movement between the epidermis material and the cushion body, unlike coupling due to a string and a tape having a high intensity.

Figure 8:
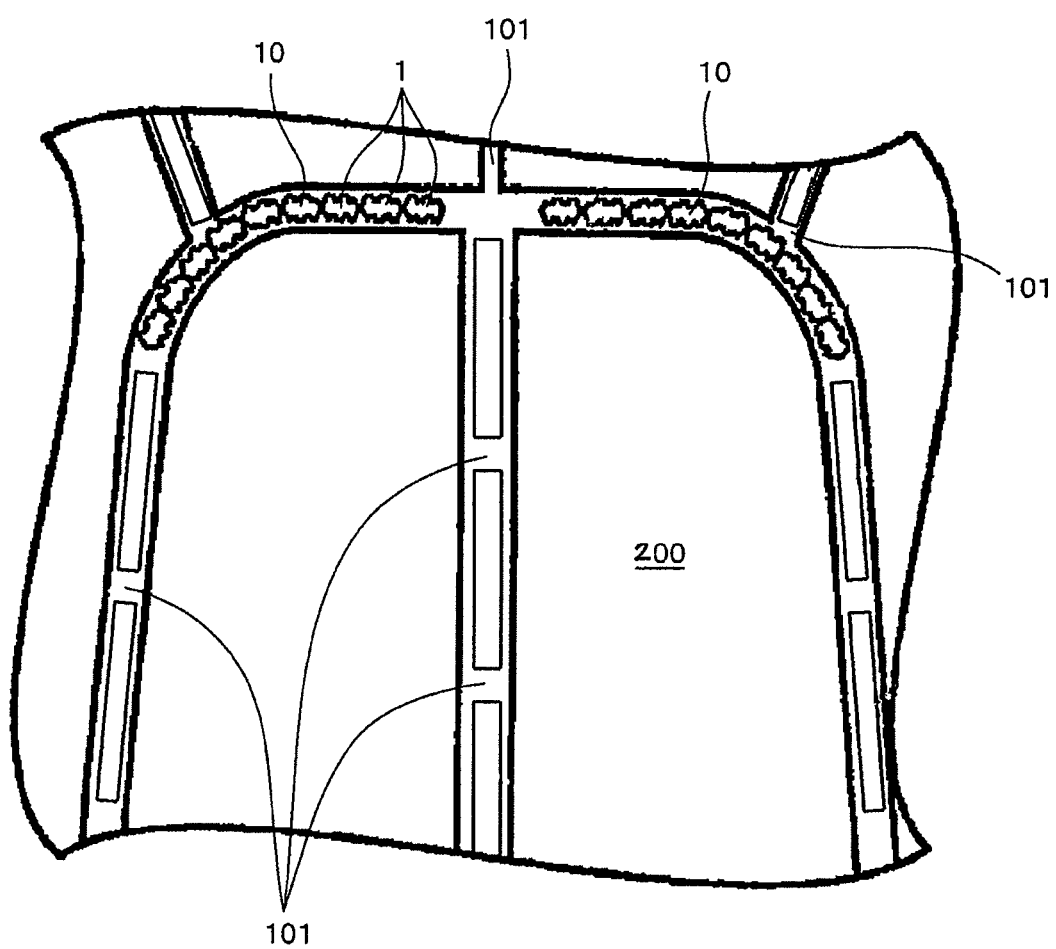
FIG. 8 is a partial surface view of a cushion body, which is an example of the foaming resin mold body, according to one embodiment.
Figure 9:
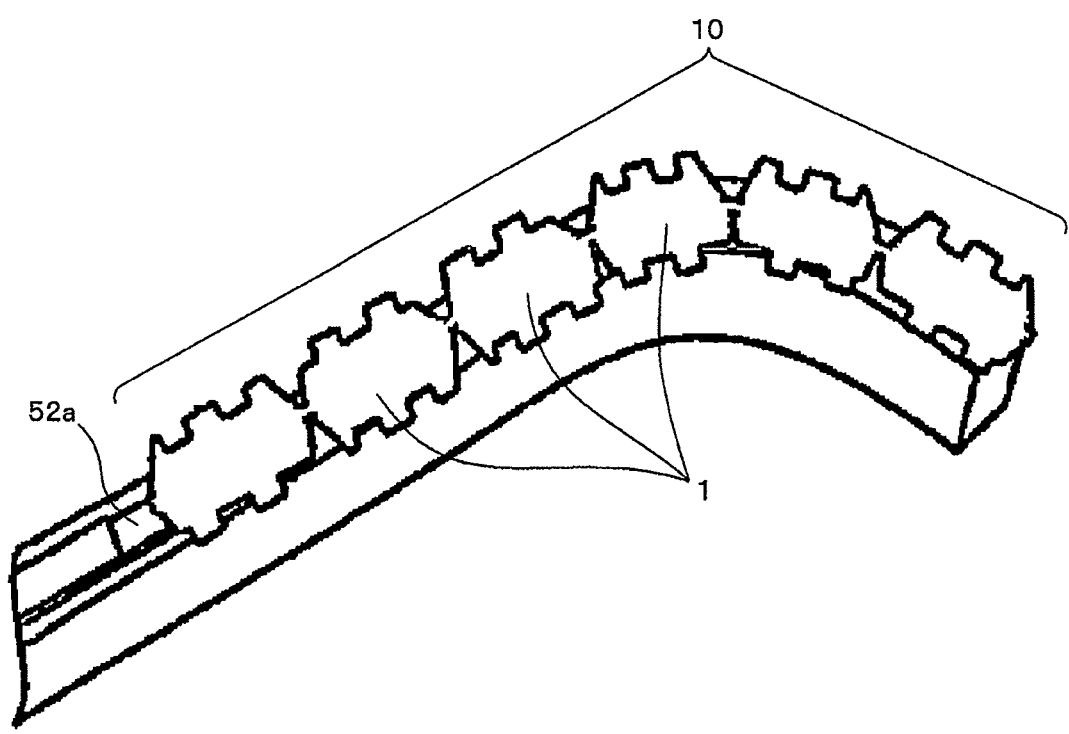
FIG. 9 is a partial perspective view showing an inner surface of the mold for molding the foaming resin mold body according to one embodiment.

As described above, in the case of the above-described cushion body, many linear recesses are formed on the surface thereof, such as the seating face and the rear part thereof. Further, the linear recesses are not limited to being in a straight line, and may be curved along the surface of the cushion body in many cases. The mold surface fastener member 10 is arranged in the linear recess. If the recess is rectilinear, the projection face 52a of the cushion body molding mold 50 is also rectilinear, and if the recess is curved, the projection face 52a is also curved. FIG. 8 diagrammatically illustrates a shape of a linear recess 101 to be formed on the surface of such a cushion body 200 and a state of the surface fastener member 10 to be integrated with the linear recess 101. FIG. 9 diagrammatically illustrates the state of the curved projection face 52a to be formed in the mold 50 for integrating the surface fastener member 10 to the linear recess 101 and the surface fastener member 10 when it is mounted on the curved projection face 52a.

If the linear recess 101 is rectilinear, as shown in FIG. 8, for example, the continuous male surface fastener 10' formed in a straight, rectilinear shape may be mounted and fixed in the recess. However, as shown in FIG. 8, the rectilinear, male surface fastener 10' is not able to bend in a width direction. Accordingly, this continuous male surface fastener 10' does not fit well in the curved linear recesses 101. As described above, the male surface fastener member 10 according to various embodiments is formed by connecting a plurality of shorter male surface fastener strips 1 along their longitudinal axes via the connecting portion 4, so that the adjacent male surface fastener strips 1 can be relatively rotated in the width direction (along the flat face of the base material 2 via the connecting portion 4). Therefore, assuming that the projecting face 52a of the cushion molding mold 50 is curved as shown in FIG. 9, the male surface fastener member 10 can be mounted along the upper face of the projecting face 52a that is curved, and as shown in FIG. 8, the male surface fastener strips 1 can be integrally molded along the curved linear recess 101 of the cushion body 200. It is noted that the male surface fastener member 10 cut to accommodate curved recesses can also be used in rectilinear recesses.

Alternative Embodiments of the Male Surface Fastener

Figure 11:
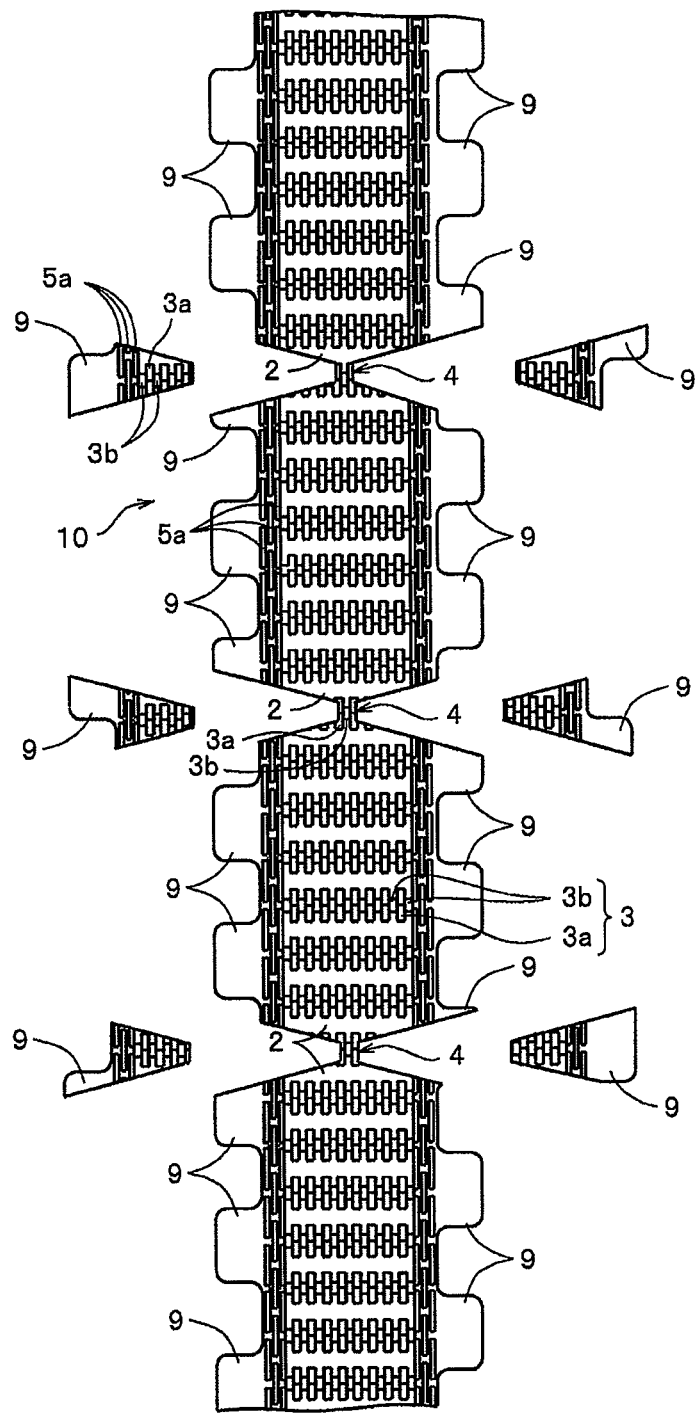
FIG. 11 is a plan view of the male surface fastener member shown in FIG. 1 that is partially cut.

FIG. 11 illustrates a modified example of the embodiment shown in FIG. 1. Since this configuration is not substantially different from the embodiment described above with reference to FIG. 1, the parts corresponding to this embodiment that are the same are given the same names and the same reference numbers and numerals as the embodiment shown in FIG. 1.

The modified example of the embodiment shown in FIG. 1 is different from the embodiment shown in FIG. 1 in that when the portions of the base material 2 are cut along the width direction to segment the base material, the portion of engaging elements 3 that covers the linear body 8 is left intact. Thus, the connecting portion 4 includes the linear body 8, which is buried, and the engaging elements 3 that are disposed vertically adjacent the linear body 8. In the modified embodiment shown in FIG. 11, the cut portions of the base material 2 are cut in substantially the shape of triangles such that the apexes of two triangles are opposite each other adjacent the linear body 8.

Figure 12:
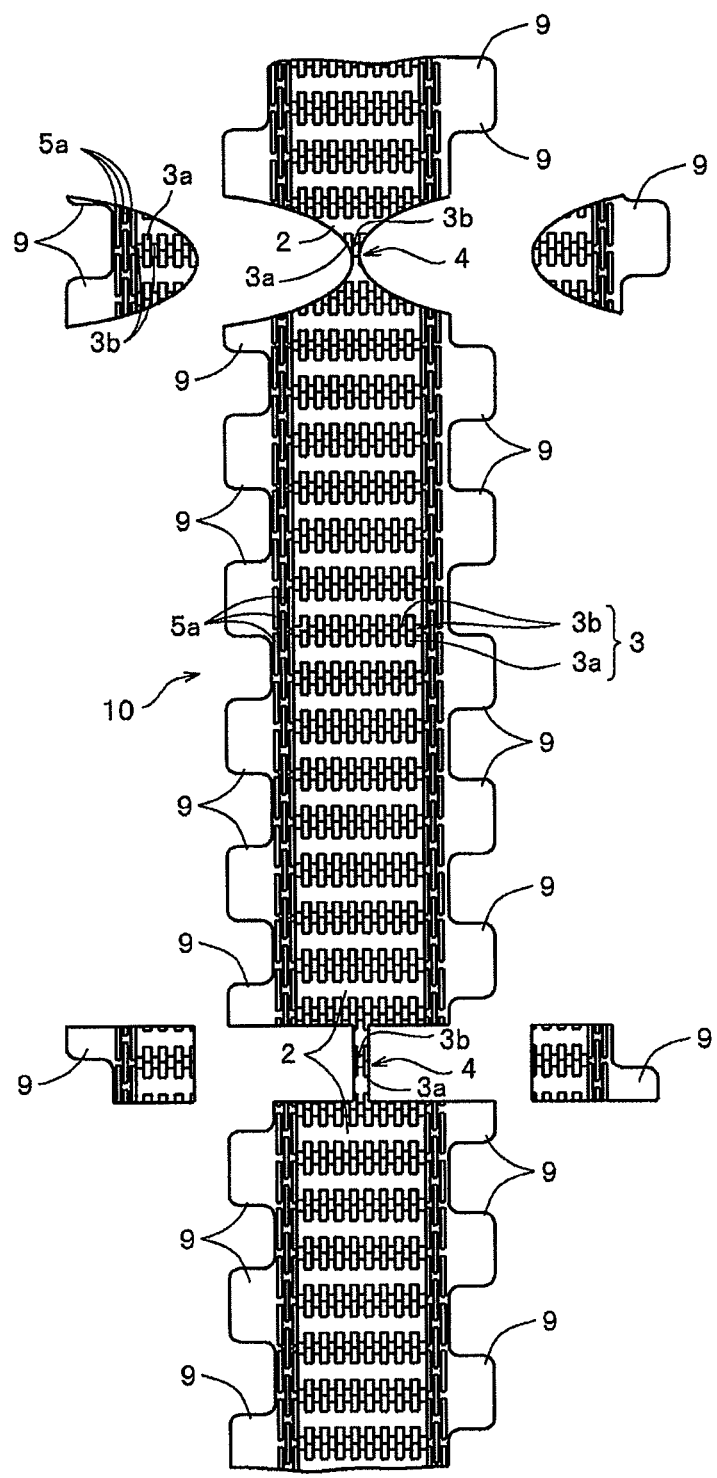
FIG. 12 is a plan view of the male surface fastener member shown in FIG. 1 that is partially cut.
Figure 13:
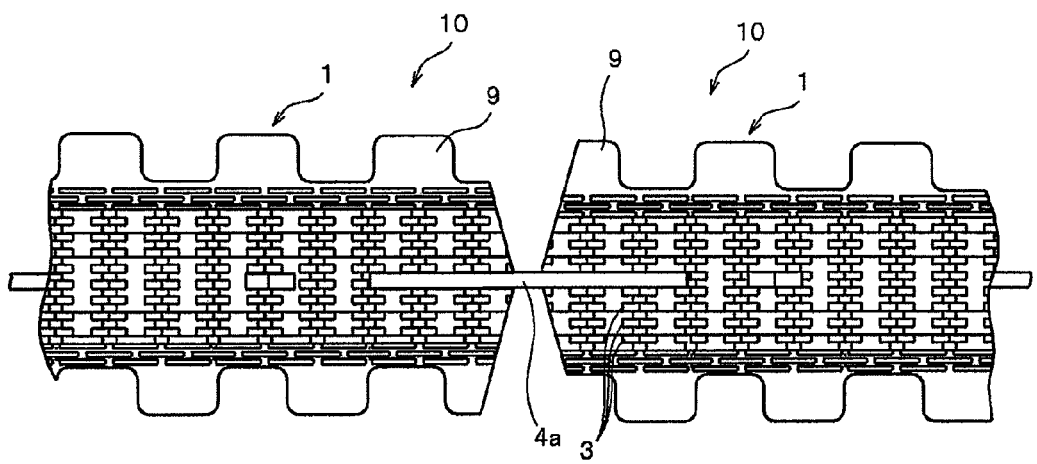
FIG. 13 is a plan view partially showing a male surface fastener member according to a second embodiment of the invention.

According to a second embodiment, the processing of the cut strip is simplified, and the engaging elements 3 of the surface fastener portion remain on the connecting portion 4, which allows them to realize an anchor effect by being buried in the foaming resin molding body. This arrangement allows the male surface fastener member 10 to be strongly fixed in the molten resin material 200. FIG. 12 illustrates an example of the above-described second embodiment. According to the modified example, the male surface fastener 10' is cut not into a triangular shape, as described above in relation to FIG. 11. Instead, the cut portions are alternately cut into an arcuate shape and a rectangular shape. For example, the arcuate shape is formed by cutting half of an oval figure from each side of the male surface fastener 10'. A portion of the fin-like strip 9 may also be removed as part of the cut portions. The functions of the male surface fastener 10' described in FIG. 12 are not substantially different from those described in relation to the other embodiments.

FIGS. 13 to 16 illustrate a third embodiment of the invention. Also according to the embodiment, the main configuration of the male surface fastener strip 1 is not substantially different from the above-described embodiments. Accordingly, the parts corresponding to the other embodiment are given the same names and the same reference numbers and numerals as the other embodiments.

At first, according to the third embodiment, the continuous male surface fastener member 10' formed in a tape-like shape is cut and separated into individual strips. The separation shape in this case is a triangular shape with apexes at both end portions along the longitudinal axis passing through a center in a width direction of the base material 2. In this case, the linear magnetic body 7 buried in the base material 2 is cut at the same time. According to this embodiment, the connecting portion 4 is manufactured independently from the male surface fastener strip 1.

Figure 14:
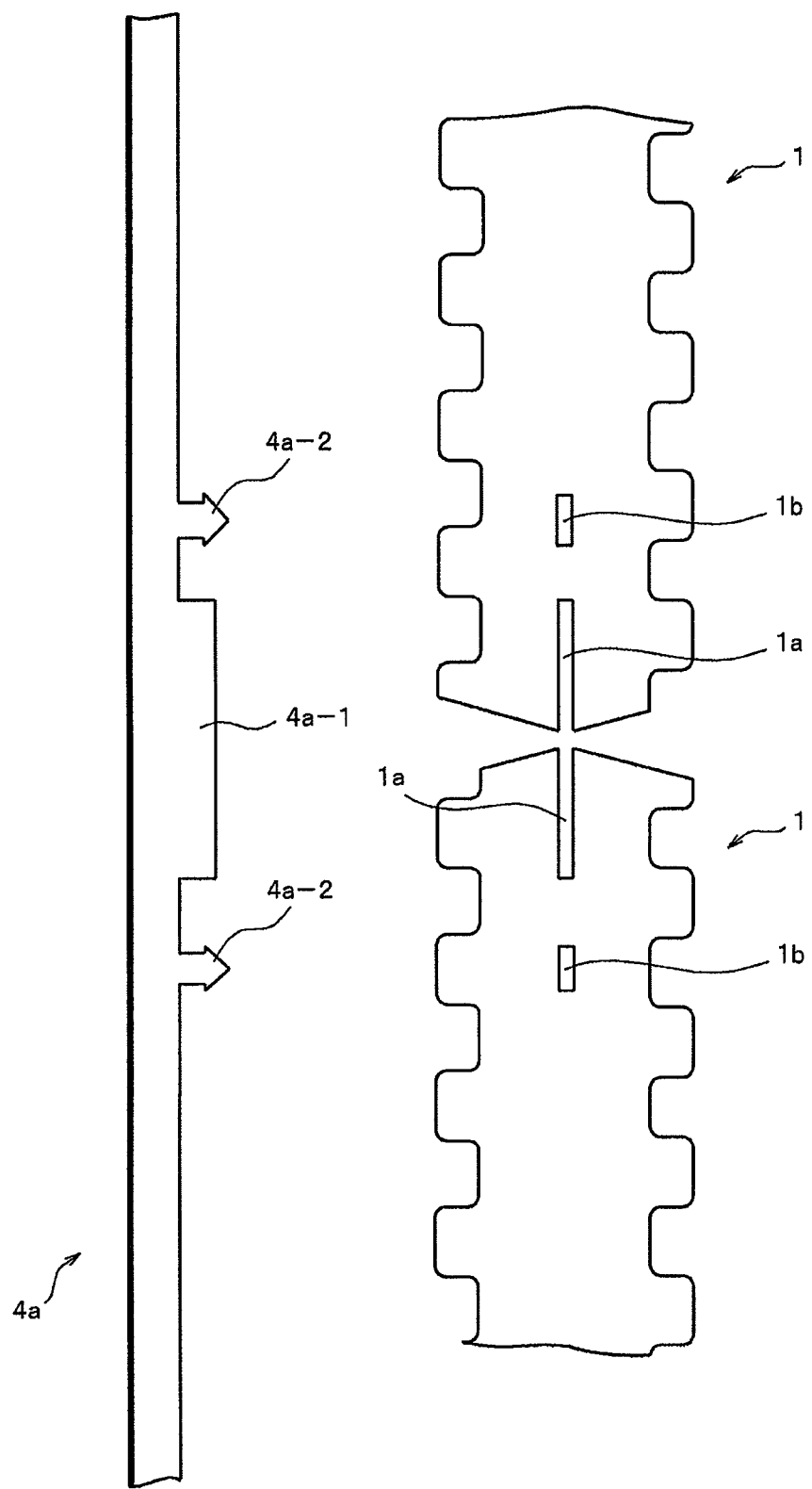
FIG. 14 is a partial exploded view of the male surface fastener member and the connecting member shown in FIG. 13.

As shown in FIG. 14, the connecting end portion of the above-described male surface fastener strip 1 has a first slit 1a having a first length and a second slit 1b having a second length, wherein the second length is shorter than the first length. The first slit 1a extend from an end of the strip 1 along the longitudinal axis of the strip 1, and the second slit 1b is defined inside of the first slit 1a and the longitudinal axis of the strip 1. The above-described connecting portion 4 includes a narrow plate-like bar strip 4a made of a synthetic resin, and the bar strip 4a has a substantially rectangular cross sectional shape. The bar strip 4a, according to one embodiment, is separately formed from the strips 1. The bar strip 4a engages adjacent strips 1 to secure them in an end-to-end relationship to form a male surface fastener member 10. In an alternative embodiment, the narrow plate-like bar strip 4a may be made of a metal.

As shown in FIG. 14, the narrow plate-like bar strip 4a has first and second fastening strips 4a-1 and 4a-2 to be fitted and fastened with the first and second slits 1a and 1b of the male surface fastener strip 1. According to this embodiment, the first fastening strip 4a-1 is formed in a narrow rectangular shape, and the first fastening strip 4a-1 is engaged with the first slits 1a of two adjacent strips 1. The second fastening strip 4a-2 is formed in an arrowhead shape, and the second fastening strip 4a-2 is engaged with the second slit 1b of an individual strip 1. The right and left width of a head portion of the arrowhead shape of the second fastening strip 4a-2 is longer than the length of the second slit 1b.

Figure 15:
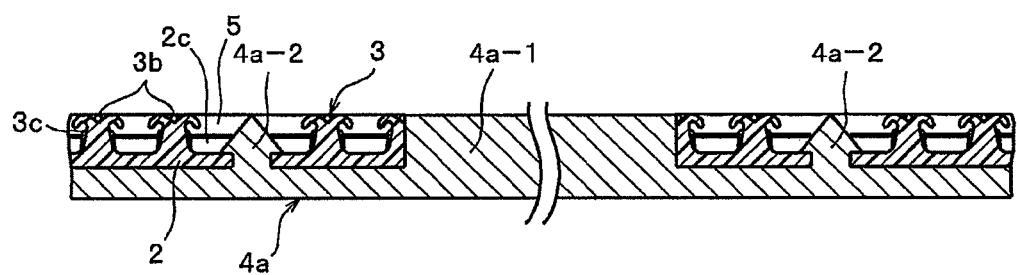
FIG. 15 is a partial longitudinal cross sectional view through the XV-XV line of the male surface fastener strips and connecting portion shown in FIG. 13.
Figure 16:
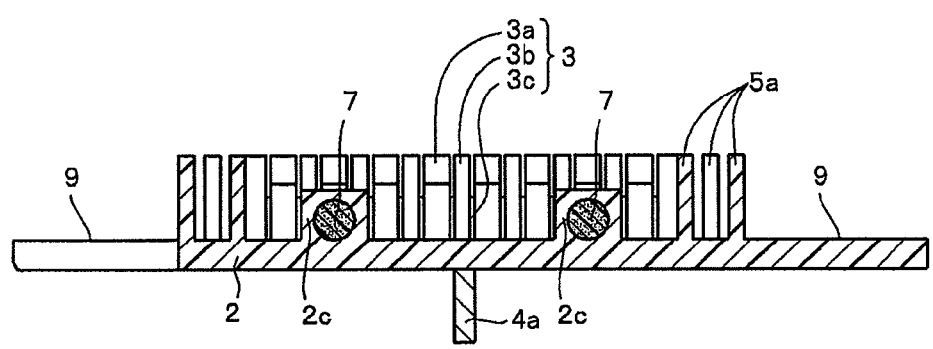
FIG. 16 is a partial lateral cross sectional view through the XVI-XVI line of the male surface fastener strips and the connecting portion shown in FIG. 13.

As shown in FIG. 15 and FIG. 16, the connection between the male surface fastener strips 1 provided with the above-described configurations is made in such a manner that the first fastening strip 4a-1 of the narrow plate-like bar strip 4a is fitted to each of the first slits 1a of the connection ends of adjacent male surface fastener strips 1, and the arrowhead portion of the second fastening strip 4a-2 of the narrow plate-like bar strip 4a is fastened to the second slit 1b by inserting the arrowhead of the fastening strip 4a-2 of the narrow plate-like bar strip 4a into the second slit 1b of the male surface fastener strip 1. The cross section of the connection portion according to this embodiment is formed into a modified cross section, of which the thickness direction is longer than a width direction of the male surface fastener member 10. By forming the cross section of the connection portion in this way, the male surface fastener member 10 is easily curved in a width direction but is hardly curved in a thickness direction. Therefore, the installation operation of the male surface fastener member 10 is easily carried out. Various embodiments of the structure of this type of connection portion 4a are described in U.S. application Ser. No. 12/133,572, filed Jun. 5, 2008, which is herein incorporated by reference.

Figure 17:
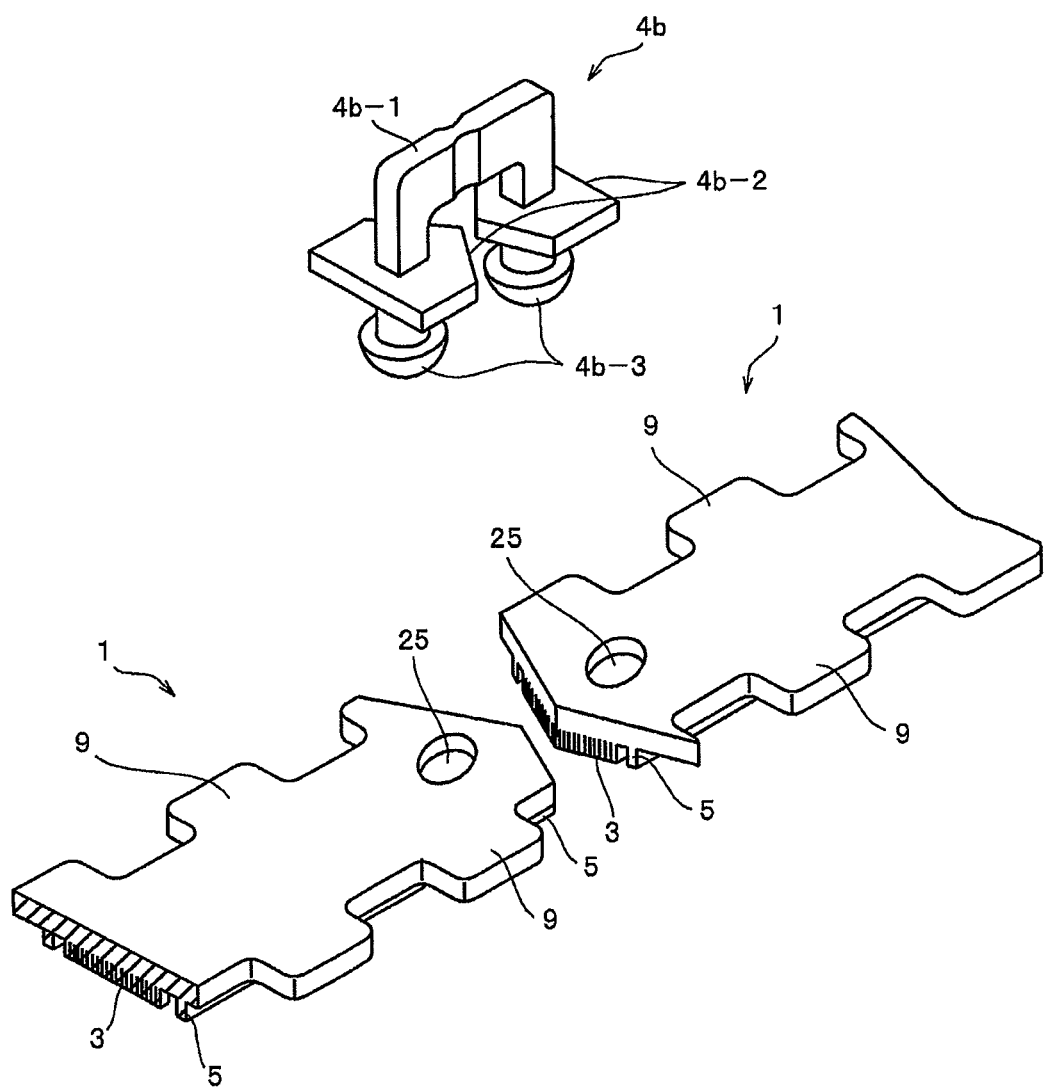
FIG. 17 is a partial perspective view of a male surface fastener member and connecting portion according to a third embodiment of the invention.

FIG. 17 is an exploded, perspective view of the male surface fastener member 10 according to a fourth embodiment. The male surface fastener member 10 according to this embodiment includes male surface fastener strips 1 and a small strip 4b as the connecting portion 4.

According to this embodiment, the male surface fastener strip 1 and the small strip 4b as the connecting portion 4 are independently manufactured. The male surface fastener strip 1 shown in FIG. 17 is not substantially different from the male surface fastener strips 1 described above in relation to the other above-described embodiments. However, in the embodiment shown in FIG. 17, each male surface fastener strip 1 defines a circular fastening hole 25 that extends through the upper and lower surfaces of the base material 2, and the circular fastening holes 25 are disposed adjacent each end of the male surface fastener strip 1. The small strip 4b has a flat-type flange 4b-2 on each end of two leg portions extending from a main body 4b-1, and the leg portions and main body 4b-1 substantially form a U-shape. Each leg portion further includes a fastening portion 4b-3 on a distal end thereof, and the fastening portion 4b-3 includes a substantially hemispherically shaped portion. The flat-type flange 4b-2 on each leg portion is disposed between the fastening portion 4b-3 and the main body 4b-1, and a wide portion of the hemispherically shaped portion is opposite and faces the flange 4b-2.

To connect the end portions of adjacent male surface fastener strips 1 using the small strip 4b, each hemispherically shaped fastening portion 4b-3 of the small strip 4b is engaged into the fastening hole 25 of each of the adjacent male surface fastener strips 1 from the lower surface 2b of the male surface fastener strip 1. In this case, the hemispherically shaped fastening portion 4b-3 is elastically modified to make its diameter smaller, and then, the hemispherically shaped fastening portion 4b-3 is squeezed into the fastening hole 25. After being squeezed through the fastening hole 25, the hemispherically shaped fastening portion 4b-3 recovers its original shape such that it does not pass back through the fastening hole 25. Once fastened together, the small strip 4b and the male surface fastener strip 1 are able to rotate relatively freely about the leg portion of the small strip 4b with the male surface fastener strip 1 being sandwiched between the flange 4b-2 and the hemispherically shaped fastening portion 4b-3. This embodiment allows the male surface fastener member 10 to be reliably positioned and fixed along a curved linear recess in the surface of the foaming resin mold body (not illustrated).

Figure 18:
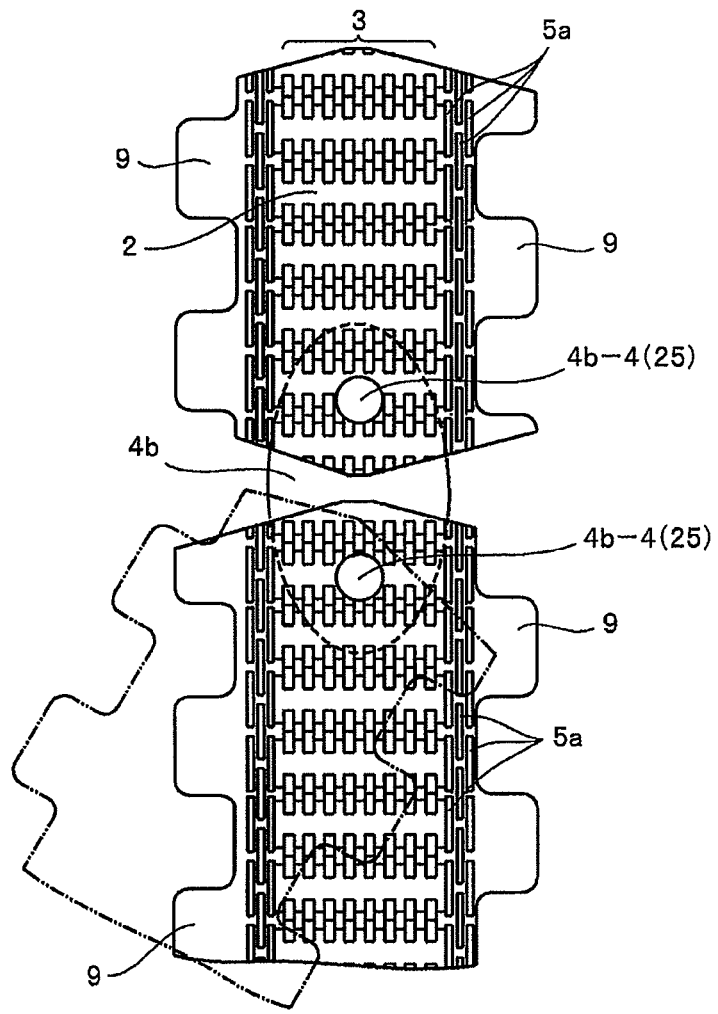
FIG. 18 is a partial plan view of the male surface fastener member according to another embodiment.
Figure 19:
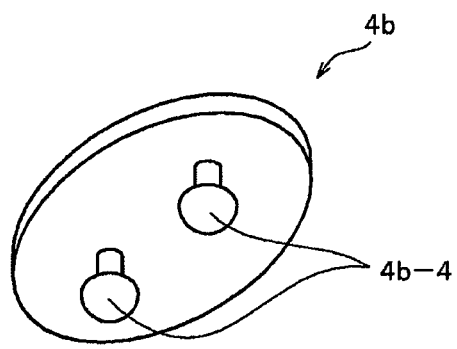
FIG. 19 is a perspective view showing the connecting member shown in FIG. 18.
Figure 20:
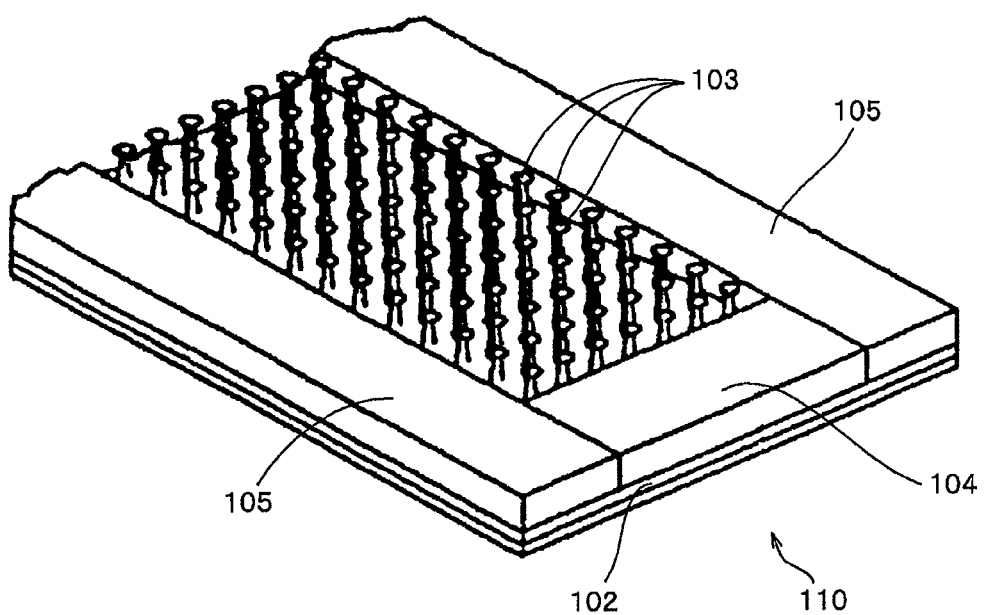
FIG. 20 is a partial perspective view of a prior art surface fastener.
Figure 21:
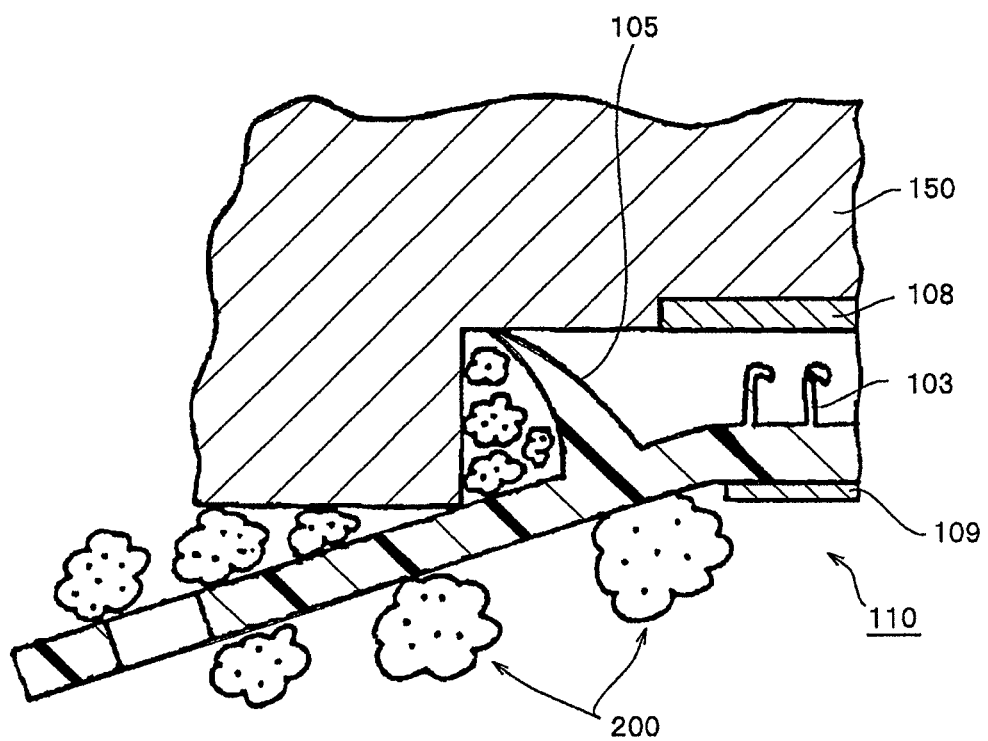
FIG. 21 is a partial cross sectional view of a prior art surface fastener during the foaming and molding process.

FIG. 18 and FIG. 19 illustrate a modified example of the fourth embodiment, and the modified example is different from the forth embodiment in the shape and the structure of the small strip 4b. In the small strip 4b according to the modified example, as shown in FIG. 19, two fastening portions formed in a mushroom-like shape are standing on one face of the small, plate-like, oval-shaped strip along a longitudinal axis of the oval-shaped strip, and a spherical fastening head portion 4b-4 of each fastening portion is squeezed into the fastening hole 25 of the male surface fastener strip 1 from the second surface side 2b. Due to the pushing, the fastening head portion 4b-4 elastically recovers its original shape to secure itself within the fastening hole 25. Also according to the modified example, as well as the above-described fourth embodiment, the adjacent male surface fastener strips 1 are rotated relatively freely via the small strip 4b that is the connecting portion between the adjacent male surface fastener strips 1.

Various embodiments of the present invention are described above. However, the present invention is not limited to the illustrated examples. For example, various kinds of configurations that have been conventionally known can be adopted as the configuration of the engaging elements, forming the recess on the surface of the base material so as to raise the engaging elements from its bottom face, securing flexibility of the surface fastener, and making the heights of the engaging element, the divisional wall portion, and the lateral wall portion lower in the event that the entire thickness of the surface fastener is to be made thinner. In addition, any connecting portion can be arbitrarily adopted without being limited to the above-described examples if it connects the adjacent male surface fastener strips 1 with each other while allowing the relative rotation of the adjacent male surface fastener strips 1.

The invention claimed is:

1. A manufacturing method for forming a cushion body having at least one integrally molded male surface fastener member, the manufacturing method comprising steps of:
   molding a continuous male surface fastener formed in a tape-like shape;
   forming a male surface fastener member from the continuous male surface fastener, the male surface fastener member comprising a plurality of male surface fastener strips cut from the continuous male surface fastener, the plurality of male surface fastener strips being connected with each other via a connecting portion having a width that is less than a width of the male surface fastener strips such that end portions of adjacent male surface fastener strips are opposed to each other along a longitudinal axis of the strips, and the continuous male surface fastener comprising a flat-type base material and a plurality of engaging elements integrally molded on and extending upwardly from a first surface of the base material;
   wherein the step of forming the male surface fastener member from the continuous male surface fastener comprises a step of cutting, at predetermined longitudinal intervals, each of the male surface fastener strip from the continuous male surface fastener by removing portions of the continuous male surface fastener on each side of a center portion of the continuous male surface fastener in a width direction while leaving the center portion so as to constitute the connecting portion between each male surface fastener strip;
   arranging the male surface fastener member in a mold for forming the cushion body such that the first surface is disposed to face and contact an inner face of the mold;
   flowing a foaming resin into the mold for forming the cushion body; and
   removing the foaming resin from the mold for forming the cushion body.

2. The manufacturing method of Claim 1, wherein the continuous male surface fastener further comprises:
   first and second longitudinal resin intrusion prevention walls arranged adjacent to longitudinal edge portions of the first surface; and
   a plurality of lateral resin intrusion prevention walls extending upwardly from the first surface and along a width direction of the base material between the first and second longitudinal resin intrusion prevention walls, and
   wherein the portions removed in the step of cutting include the flat-type base material.

3. A manufacturing method for forming a cushion body having at least one integrally molded male surface fastener member, the manufacturing method comprising steps of:
   molding a continuous male surface fastener formed in a tape-like shape, wherein the continuous male surface fastener comprises:
      first and second longitudinal resin intrusion prevention walls arranged adjacent to longitudinal edge portions of the first surface; and
      a plurality of lateral resin intrusion prevention walls extending upwardly from the first surface and along a width direction of the base material between the first and second longitudinal resin intrusion prevention walls,
   forming a male surface fastener member from the continuous male surface fastener, the male surface fastener member comprising a plurality of male surface fastener strips cut from the continuous male surface fastener, the plurality of male surface fastener strips being connected with each other via a connecting portion having a width that is less than a width of the male surface fastener strips such that end portions of adjacent male surface fastener strips are opposed to each other along a longitudinal axis of the strips, and the continuous male surface fastener comprising a flat-type base material and a plurality of engaging elements integrally molded on and extending upwardly from a first surface of the base material;
   wherein the step of forming the male surface fastener member from the continuous male surface fastener comprises a step of cutting, at predetermined longitudinal intervals, each of the male surface fastener strip from the continuous male surface fastener by removing portions of the continuous male surface fastener on each side of a center portion of the continuous male surface fastener in a width direction while leaving the center portion so as to constitute the connecting portion between each male surface fastener strip;
   wherein the portions removed in the step of cutting include the flat-type base material;
   wherein the portions removed in the step of cutting includes at least one of the engaging elements, the first and second longitudinal resin intrusion prevention walls and the lateral resin intrusion prevention walls;
   arranging the male surface fastener member in a mold for forming the cushion body such that the first surface is disposed to face and contact an inner face of the mold;
   flowing a foaming resin into the mold for forming the cushion body; and
   removing the foaming resin from the mold for forming the cushion body.

4. A manufacturing method for forming a cushion body having at least one integrally molded male surface fastener member, the manufacturing method comprising steps of:
   molding a continuous male surface fastener formed in a tape-like shape, wherein the continuous male surface fastener further comprises:
      first and second longitudinal resin intrusion prevention walls arranged adjacent to longitudinal edge portions of the first surface; and
      a plurality of lateral resin intrusion prevention walls extending upwardly from the first surface and along a width direction of the base material between the first and second longitudinal resin intrusion prevention walls;

forming a male surface fastener member from the continuous male surface fastener, the male surface fastener member comprising a plurality of male surface fastener strips cut from the continuous male surface fastener, the plurality of male surface fastener strips being connected with each other via a connecting portion having a width that is less than a width of the male surface fastener strips such that end portions of adjacent male surface fastener strips are opposed to each other along a longitudinal axis of the strips, and the continuous male surface fastener comprising a flat-type base material and a plurality of engaging elements integrally molded on and extending upwardly from a first surface of the base material;

wherein the step of forming the male surface fastener member from the continuous male surface fastener comprises a step of cutting, at predetermined longitudinal intervals, each of the male surface fastener strip from the continuous male surface fastener by removing portions of the continuous male surface fastener on each side of a center portion of the continuous male surface fastener in a width direction while leaving the center portion so as to constitute the connecting portion between each male surface fastener strip; arranging the male surface fastener member in a mold for forming the cushion body such that the first surface is disposed to face and contact an inner face of the mold;

wherein the plurality of engaging elements are disposed at an area surrounded by the first and second longitudinal resin intrusion prevention walls and the lateral resin intrusion prevention walls, and wherein the portions removed in the step of cutting are portions between adjacent lateral resin intrusion prevention walls and include the flat-type base material.

5. The manufacturing method of claim 4, wherein each of the male surface fastener strips comprises the base material, the plurality of engaging elements, the first and second longitudinal resin intrusion prevention walls and the lateral resin intrusion prevention walls, wherein the base material is left in the step of cutting between one of the lateral resin intrusion prevention walls of one of the male surface fastener strips and another of the lateral resin intrusion prevention walls of another of the male surface fastener strips which is disposed adjacent to the one of the male surface fastener strips, and wherein in the step of flowing, the foaming resin is flowed into the first surface of the base material which is left in the step of cutting.

6. The manufacturing method of claim 4, wherein at least one of the base material, the plurality of engaging elements, the first and second longitudinal resin intrusion prevention walls and the lateral resin intrusion prevention walls is left in the step of cutting between one of the lateral resin intrusion prevention walls of one of the male surface fastener strips and another of the lateral resin intrusion prevention walls of another of the male surface fastener strips which is disposed adjacent to the one of the male surface fastener strips.

* * * * *